(12) United States Patent
Kawabe et al.

(10) Patent No.: US 6,374,693 B1
(45) Date of Patent: Apr. 23, 2002

(54) VARIABLE STEERING RATIO STEERING SYSTEM

(75) Inventors: Yoshihiro Kawabe, Kanagawa; Yoshiteru Minagawa, Yokohama, both of (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 09/558,342

(22) Filed: Apr. 26, 2000

(30) Foreign Application Priority Data

Apr. 26, 1999 (JP) .......................................... 11-117867
Sep. 9, 1999 (JP) .......................................... 11-256036

(51) Int. Cl.⁷ .............................. B62D 3/06; B62D 3/12; B62D 5/04
(52) U.S. Cl. .................... 74/499; 74/89.31; 74/388 PS; 74/422; 180/443; 180/446
(58) Field of Search ............................ 74/89.29, 89.31, 74/422, 499, 500, 388 PS; 180/443, 446

(56) References Cited

U.S. PATENT DOCUMENTS 4,290,344 A * 9/1981 Adams ........................ 91/467
5,174,407 A * 12/1992 Shimizu et al. ............. 180/444
5,482,130 A * 1/1996 Shimizu ..................... 180/447

FOREIGN PATENT DOCUMENTS

JP            4-243667         8/1992

* cited by examiner

Primary Examiner—Allan D. Herrmann
(74) Attorney, Agent, or Firm—McDermott, Will & Emery

(57) ABSTRACT

A variable-ratio steering system includes a steering shaft connected to a manually-operated handle, a ball nut engaging with the steering shaft and a ball-bearing-screw mechanism converting rotary motion of the steering shaft into axial displacement of the ball nut in the axial direction of the steering shaft. Also provided is a second motion converter which generates a rotational displacement of the ball nut about the axis of the steering shaft with the axial displacement of the ball nut. A steering pinion gear block is connected to the ball nut by means of serrations to rotate together with the ball nut. A rack is engaged with the pinion gear block and connected at both ends via knuckle mechanisms to steered wheels for varying a steer angle at the steered wheels depending on the displacement of the rack. The second motion converter having a variable steering ratio mechanism which varies a ratio of a rotational displacement of the ball nut about the axis of the steering shaft to the axial displacement of the ball nut to vary a steering ratio of steering wheel rotation angle to road-wheel steer angle.

22 Claims, 11 Drawing Sheets

VARIABLE STEERING RATIO STEERING SYSTEM

BACKGROUND OF THE INVENTION

1. Field of the Invention

The present invention relates to a variable steering ratio steering system capable of varying a steering ratio of steering wheel rotation angle to steer angle at road wheels.

2. Description of the Prior Art

Many steering systems provide variable-ratio steering. One such variable steering ratio steering system has been disclosed in Japanese Patent Provisional Publication No. 4-243667. In the variable-ratio steering system disclosed in the Japanese Patent Provisional Publication No. 4-243667, in a similar manner as a typical recirculating-ball steering gear, a ball-screw mechanism is constructed by a worm shaft on the end of the steering shaft, a ball nut, and recirculating balls interposed between the worm teeth of the worm shaft and grooves cut in the inner face of the ball nut. A rotating member is mechanically linked to the steered wheel and interleaved between the steered wheel (the road wheel) and the steering wheel, so that the rotating member rotates according to the steering of the road wheels. A converting nut member is fitted oscillatingly onto the ball nut and housed so that the converting nut member is axially movable and rotatable about the axis. The converting nut member is also engaged with a lever member. By virtue of engagement between the converting nut member and the lever member, the oscillating motion (rotational displacement) of the converting nut member produces a change in the distance from the rotation center of the rotating member to the engaged position (the engaged point) between the tip of the armed portion of the converting nut member and the inner peripheral wall surface of the lever member. Also provided is a converter which permits a rectilinear motion of the converting nut member and a pivotal motion of the lever member to be transmitted in the mutually convertible state. The converting nut member is driven by means of a drive mechanism so as to produce the previously-noted oscillating motion (that is, the change in the distance from the rotation center of the rotating member to the engaged position). Depending on the change in distance from the rotation center of the rotating member to the engaged position, it is possible to vary the ratio of the pivotal angle of the lever member to the displacement of the converting nut member, that is, the steering ratio. As discussed above, in the steering system disclosed in the Japanese Patent Provisional Publication No. 4-243667, a rotary motion of the steering wheel is converted into a linear motion acting in the axial direction of the steering shaft by means of the ball screw mechanism in a conventional manner, and then the linear motion of the steering shaft is converted into rotational displacement (pivotal movement) by means of the lever member cooperating with the converting nut member. The rotational displacement (pivotal movement) of the lever member is further converted into a linear motion of a rack in the longitudinal direction of the rack by means of a rack-and-pinion steering gear mechanism.

The previously-discussed conventional variable ratio steering system is complicated in structure. The steering-wheel rotation angle, that is, the rotational angle (or torque) of the steering wheel, is transmitted to the rack through the steering shaft, the ball nut, the converting nut member, the lever member, and the rack-and-pinion steering gear mechanism. Such a complicated variable-ratio steering system increases the number of parts of the system as well as the total weight of the system. Additionally, bearings, gears, or the like must be provided between parts coupled to each other. Many component parts results in many coupling portions, thus increasing friction loss (energy loss), and resulting in undesired rattle or freeplay (noise).

SUMMARY OF THE INVENTION

Accordingly, it is an object of the invention to provide a variable steering ratio steering system which is simple in construction while providing variable-ratio steering.

In order to accomplish the aforementioned and other objects of the present invention, a variable-ratio steering system comprises a steering shaft adapted to be connected to a manually-operated handle, an intermediate member engaging with the steering shaft, and capable of moving in a direction of an axis of the steering shaft by a rotary motion of the steering shaft, a first converter converting the rotary motion of the steering shaft into an axial displacement of the intermediate member in the direction of an axis of the steering shaft, a second converter generating a rotational displacement of the intermediate member about the axis of the steering shaft with the axial displacement of the intermediate member, a pinion gear connected to the intermediate member and capable of rotating together with the intermediate member, a rack engaged with the pinion gear, and adapted to be connected at both ends of the rack via knuckle mechanisms to steered wheels, for varying a steer angle at the steered wheels depending on a displacement of the rack, and the second converter having a variable steering ratio mechanism which varies a ratio of a rotational displacement of the intermediate member about the axis of the steering shaft to the axial displacement of the intermediate member.

According to another aspect of the invention, a variable-ratio steering system comprises a steering shaft adapted to be connected to a manually-operated handle and having a worm gear portion, a ball nut engaging with the worm gear portion of the steering shaft via recirculating balls, and capable of moving in a direction of an axis of the steering shaft by a rotary motion of the steering shaft, a first converting means for converting the rotary motion of the steering shaft into an axial displacement of the ball nut in the direction of an axis of the steering shaft, a second converting means for generating a rotational displacement of the ball nut about the axis of the steering shaft with the axial displacement of the ball nut, a pinion gear block connected to the ball nut for rotating together with the ball nut, a rack engaged with the pinion gear block, and adapted to be connected at both ends of the rack via knuckle mechanisms to steered wheels, for varying a steer angle at the steered wheels depending on a displacement of the rack, and the second converting means having a variable steering ratio mechanism which varies a ratio of a rotational displacement of the ball nut about the axis of the steering shaft to the axial displacement of the ball nut to vary a steering ratio of steering wheel rotation angle to steer angle at the steered wheels.

DESCRIPTION OF THE PREFERRED EMBODIMENTS

Figure 1:
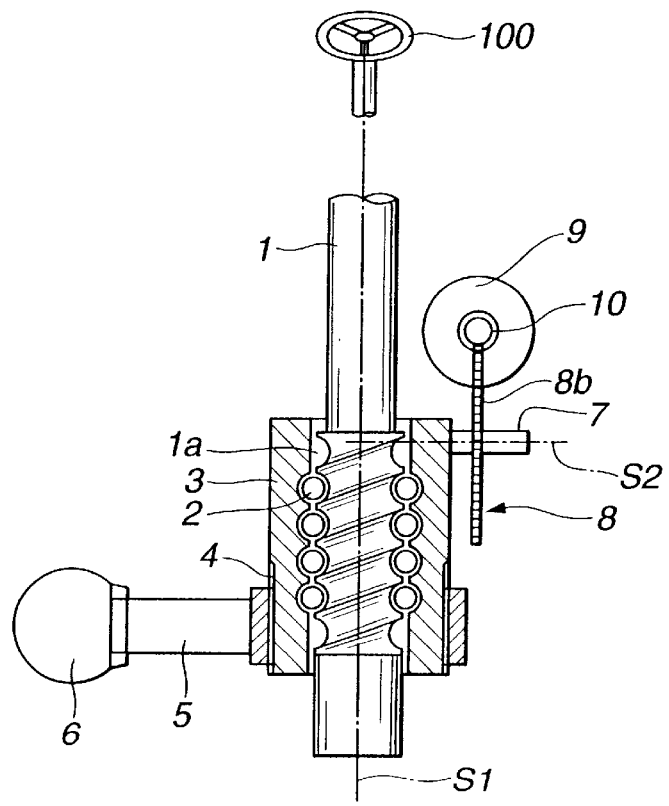
FIG. 1 is a side view illustrating a variable steering ratio mechanism incorporated in a variable-ratio steering system of the invention, partly cross-sectioned.
Figure 2:
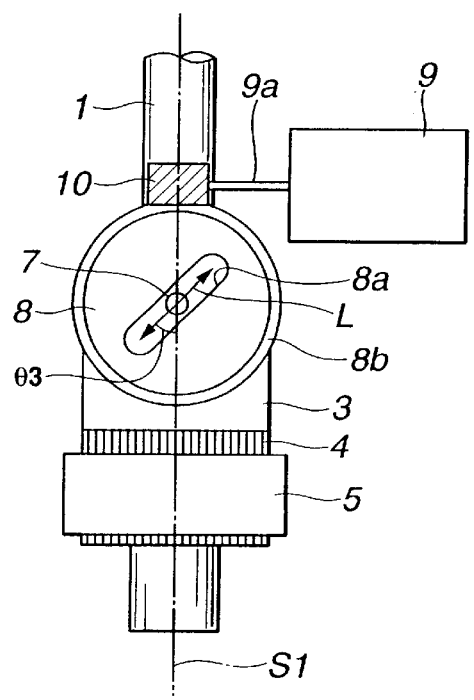
FIG. 2 is a schematic view in the direction of the rotation axis S2 of an externally-toothed, disc-shaped guide link member 8, showing the variable steering ratio mechanism incorporated in the variable-ratio steering system of FIG. 1.
Figure 3:
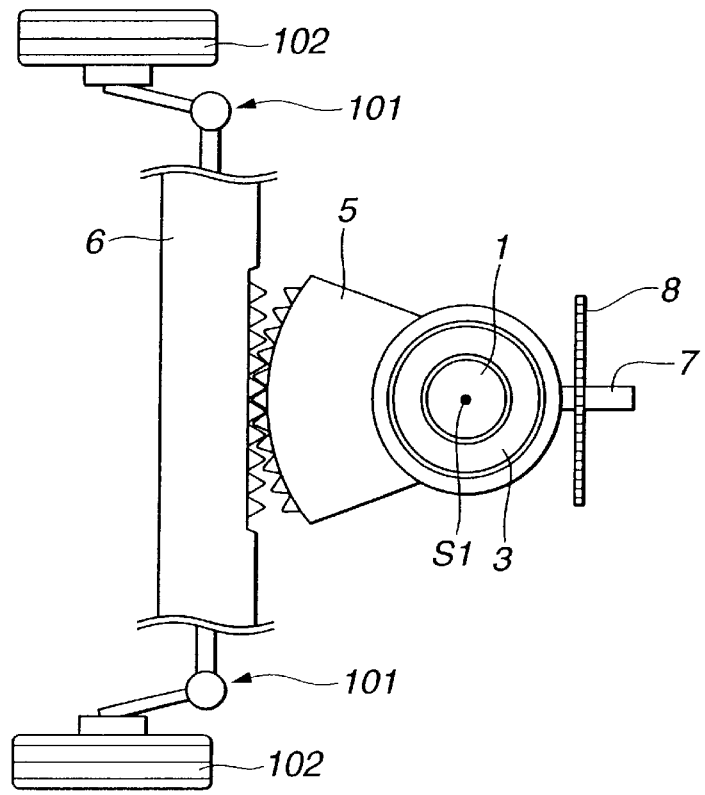
FIG. 3 is a schematic view in the direction of the axis S1 of the steering shaft 1, showing the variable steering ratio mechanism incorporated in the variable-ratio steering system of FIG. 1.

Referring now to the drawings, particularly to FIGS. 1 through 3, the upper end of a steering input shaft 1 (simply, a steering shaft) is connected to a steering wheel (or a manually-operated handle) 100 usually via a universal joint (not shown). Part of the lower end of the steering shaft 1 is formed as an external screw-threaded portion (often called a "worm gear portion") 1a. A substantially cylindrical-hollow nut member (often called a "ball nut") 3 rides on is coaxially aligned with the worm gear portion 1a of the steering shaft 1 through recirculating balls 2, so that the balls 2 roll in grooves inside the nut member 3 and in the worm gear portion 1a. The helical groove inside the nut member 3 is an internal screw-threaded portion. The worm gear portion 1a, the balls 2, and the nut member 3 construct a ball-bearing-screw mechanism (simply, a ball-screw mechanism). When the steering wheel 100 and the steering shaft 1 are turned for steering, the worm gear portion 1a rotates. The rotation of the worm gear portion 1a causes the recirculating balls 2 to roll in the worm teeth. The balls 2 also roll in the grooves cut in the inner face of the nut member 3. Thus, as the steering shaft 1 rotates, the balls 2 cause the nut member 3 to move up or down along the worm gear portion 1a. In this manner, when the steering wheel and shaft are turned for steering, the nut member 3 can move up or down an amount substantially corresponding to the steering-shaft rotation angle in the direction of the axis S1 of the steering shaft 1. As best seen in FIGS. 1 and 3, a sector-gear like pinion gear block 5 (simply, a pinion gear) has an internal serrated portion (a serration hole) which engages with an external serrated portion (a serration shaft) 4 to permit a slight sliding movement of the pinion gear block 5 along the external serrated portion 4 of the lower end of the nut member 3 in the direction of the axis S1 of the steering shaft 1. The serration-connection between the external serrated portion of the nut member and the internal serrated portion of the pinion gear block 5 allows a relative translational motion of the nut member 3 to the pinion gear block 5 in the direction of the axis S1 of the steering shaft 1. The sector-gear like external toothed portion of the pinion gear block 5 meshes with a rack 6 (see FIG. 3). When the steering wheel and shaft are turned for steering, and thus the pinion gear block 5 is rotated together with the nut member on the worm gear portion 1a in its normal-rotation direction or reverse-rotation direction, the rack 6 moves to the left or right along with the sector-gear like pinion gear block 5. Road wheels (steered wheels) 102 are connected to respective ends of the rack 6 via left and right steering knuckle mechanisms 101. The leftward-or-rightward motion of the rack 6, carried through the steering knuckle mechanisms 101, causes the steered wheels 102 to pivot for steering. For the purpose of illustrative simplicity, although it is not shown in FIGS. 1 through 3, actually, a pair of snap rings are fitted onto the uppermost and lowermost ends of the external serrated portion 4 of the nut member 3, for limiting the maximum sliding motion of the pinion gear block 5 to a predetermined amount and for preventing the pinion gear block 5 from falling away from the external serrated portion 4 of the nut member 3. The nut member 3 is formed on its outer periphery with a radially outwardly extending protruded pin portion 7 (simply, a protruded portion). In the shown embodiment, the protruded portion 7 is attached onto the outer periphery in such a manner as to radially outwardly extend in a direction perpendicular to the axial direction of the steering shaft 1. the variable-ratio steering system of the embodiment includes a toothed, disc-shaped guide link member 8 having a slotted hole (a cam slot or a guide slot) 8a through which the protruded portion 7 of the nut member 3 passes. As described hereunder in detail, the slotted hole 8a serves as a guide portion which regulates a motion of the protruded portion 7. The protruded portion 7 is loosely fitted into the slotted hole 8a, so that the protruded portion 7 is slidable within the slotted hole 8a in the directions L that the slotted hole extends. That is, the protruded portion 7 is guided by the slotted hole 8a, so that the movement of the protruded portion 7 is limited or regulated by a cam surface of the slotted hole 8a and thus the protruded portion 7 is movable only in directions L that the slotted hole 8a extends. The disc-shaped guide link member 8 is supported in such a manner as to be able to rotate about the rotation axis S2 perpendicular to the axis S1 of the steering shaft 1. The protruded portion 7 cooperates with the slotted hole 8a of the disc-shaped guide link member 8 to provide a rotational-displacement regulation means (a rotational-displacement regulation section) for the nut member 3 which is movable rectilinearly in the direction of the axis S1 of the steering shaft 1 and additionally rotatable about the steering shaft 1. As viewed in the direction of the rotation axis S2 of the disc-shaped guide link member 8, that is, as shown in FIG. 2, the slotted hole 8a formed in the disc-shaped guide link member 8 is inclined by a predetermined inclination angle θ3 clockwise (viewing FIG. 2) with respect to the axis S1 of the steering shaft 1. The rotation axis S2 of the disc-shaped guide link member 8 passes through the central point of the slotted hole 8a. In the shown embodiment, the rotation axis S2 of the disc-shaped guide link member 8 is designed to be identical to the axis of the protruded portion 7 of the nut member 3, when the steered wheels 102 do not yet pivot and thus the steered wheels are held at their straight-ahead positions. Alternatively, suppose the protruded portion 7 is not formed to extend in a direction perpendicular to the axial direction of the steering shaft 1. For example, if the protruded portion 7 is formed to extend in a direction somewhat inclined from the direction perpendicular to the axial direction of the steering shaft 1, it is preferable to set a part of the protruded portion 7, which part is located within and cammed by the slotted hole 8a, in such a manner as to intersect the rotation axis S2 of the disc-shaped guide link member 8, under a particular condition where the steered wheels 102 are held at the straight-ahead positions. Also, the disc-shaped shaped guide link member 8 is formed on its outer periphery with an external toothed portion 8b. As best seen in FIG. 2, a drive gear 10 is in meshed-engagement with the external toothed portion 8b of the disc-shaped guide link member 8. the drive gear 10 is fixedly connected onto the end of the drive shaft 9a of a motor 9. With the previously noted arrangement, when the disc-shaped guide link member 8 rotates about its rotation axis S2 by rotation of the motor 9, the slotted-hole inclination angle θ3 between the center line of the slotted hole 8a extending in the directions L and the axis S1 of the steering shaft 1, can be varied. That is, a drive mechanism, composed of the motor 9, the drive shaft 9a, the drive gear 10, and the external toothed portion 8b of the disc-shaped guide link member 8, functions as an inclination-angle alteration section needed to alter the inclination angle θ3 of the disc-shaped guide link member 8. In the system of the first embodiment, the inclination-angle alteration section has a rotating mechanism which supports the guide link member 8 so that the guide link member 8 is rotatable about only the predetermined rotation axis, and alters the predetermined inclination angle. (θ3) of the guide portion 8a with respect to the axis S1 of the steering shaft 1 by rotating the guide link member 8 about the predetermined rotation axis. A supporting member for the motor 9 and a supporting member for the disc-shaped guide link member 8 are fixed to a vehicle-body side component part, such as a steering column housing, which is stationary irrespective of whether the steering wheel and shaft are turned for steering. for instance, an annular housing portion may be arranged coaxially with the disc-shaped guide link member 8 in such a manner as to surround the circumference of the disc-shaped guide link member 8, and the outer periphery of the disc-shaped guide link member 8 may be rotatably fitted into an annular groove cut in the inner peripheral wall of the annular housing portion, so as to allow rotation of the disc-shaped guide link member 8 about its rotation axis S2. In this case, an opening must be partly formed in the annular housing portion for meshed-engagement between the external toothed portion 8b of the discshaped guide link member 8 and the drive gear 10.

Figure 4:
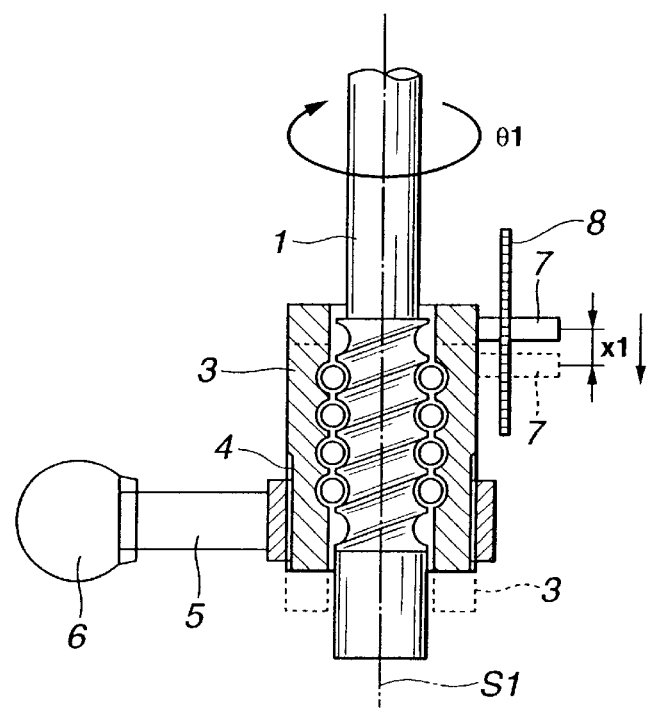
FIG. 4 is a side view illustrating the relationship between a rotary motion (θ1) of the steering shaft 1 and axial displacement (x1) of a nut member (an intermediate member) 3 or a protruded portion 7 in the variable-ratio steering system of the first embodiment.
Figure 5:
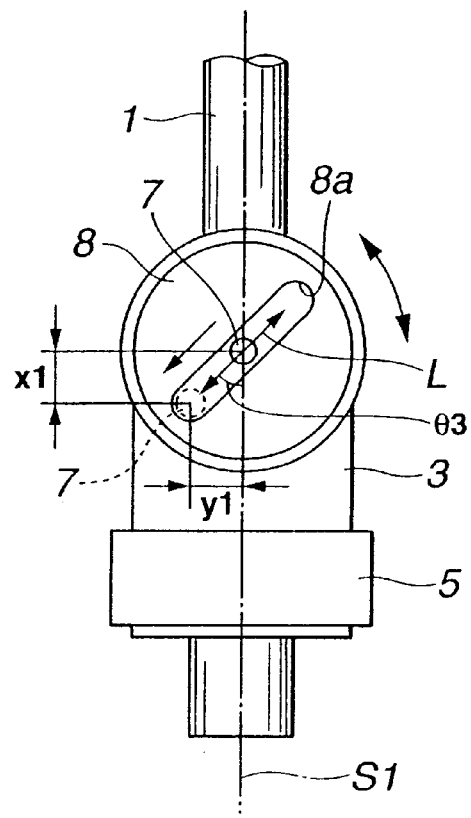
FIG. 5 is a schematic view in the direction of the rotation axis S2 of the disc-shaped guide link member 8, explaining the relationship between the axial displacement (x1) and lateral displacement (y1) of the protruded portion 7 which is formed on the nut member 3 and guided by a slotted hole 8a formed in the disc-shaped guide link member 8.

Hereinbelow discussed in detail is the operation of the variable-ratio steering system of the first embodiment. As shown in FIG. 4, when the steering wheel 100 is turned clockwise for steering and then the steering shaft 1 rotates an angle θ1, the θ1 degrees of steering-shaft rotational movement causes the nut member 3 to rectilinearly move down an axial displacement of x1 in the direction of the axis S1 of the steering shaft 1 through the recirculating balls 2 (see the broken line shown in FIG. 4). As shown in FIG. 5, when the nut member 3 moves down, the slotted hole 8a formed in the disc-shaped guide link member 8 forces the protruded portion 7 to obliquely move downwards in the direction inclined by the predetermined angle θ3 from the axis S1 of the steering shaft 1 as viewed from the direction perpendicular to the axis S1 of the steering shaft 1. As a result of this, when the protruded portion 7 moves the axial displacement of x1 in the direction of the axis S1 of the steering shaft 1 together with the nut member 3, at the same time the protruded portion 7 moves a lateral displacement of y1 in the direction perpendicular to the direction of the axis S1 of the steering shaft 1. As can be appreciated from the schematic view of FIG. 6 (as shown in the axial direction of the steering shaft 1), owing to the oblique motion of the protruded portion 7 guided by the slotted hole 8a, the nut member 3 moves spirally about the axis S1 of the steering shaft 1, and thus rotates an angle of θ2 (which angle θ2 is in direct proportional to the inclination angle θ3 of the slotted hole 8a) about the steering shaft 1. As a consequence, the pinion gear block 5, engaged with the nut member 3 by way of serration-connection, rotates the angle of θ2 together with the nut member 3. The rack 6, in meshed-engagement with the pinion gear block 5, moves to the left (viewing FIG. 6) along with the pinion gear block 5 responsively to the rotation angle θ2 of the pinion gear block 5, arising from rotation of the nut member 3 about the steering shaft 1. When the steering shaft 1 is turned for steering and then a rotary motion of the steering shaft causes the nut-member axial displacement of x1, the serration-connection between the external serrated portion 4 of the nut member 3 and the internal serrated portion of the pinion gear block 5 permits the pinion gear block 5 to slide up or down in the axial direction of the steering shaft 1, thus keeping proper reliable meshed-engagement between the pinion gear block 5 and the rack 6, irrespective of the presence or absence of the up-or-down motion of the nut member 3.

According to the system of the embodiment, when the steering ratio has to be varied, the motor 9 is first energized to rotate the disc-shaped guide link member 8 a predetermined angle about its rotation axis S2. Rotating the motor 9 varies the inclination angle θ3 of the slotted hole 8a (that is, the angle θ3 between the directions L that the slotted hole 8a extends and the axial direction of the steering shaft 1, as viewed from the direction perpendicular to the axial direction of the steering shaft 1). As a result, the steering ratio of steering wheel rotation angle to road-wheel steer angle varies. As discussed above, in the system of the embodiment, the variable steering ratio is achieved by the change in a displacement in rotation of the nut member 3 about the steering shaft 1, arising from the change in the inclination angle θ3 of the slotted hole 8a. In more detail, as appreciated from transition from the state shown in FIGS. 5 and 6 to the state shown in FIGS. 7 and 8, as the disc-shaped guide link member 8 rotates in a direction that reduces the inclination angle θ3 of the slotted hole 8a, the ratio (y1/x1 in FIGS. 5 and 6, and y2/x1 in FIGS. 7 and 8) of the lateral displacement to the axial displacement of the protruded portion 7 tends to decrease. That is to say, in case of the same steering-shaft rotational movement (θ1), the smaller the inclination angle θ3, the smaller the rotation angle θ2 of the pinion gear block 5 (the nut member 3), and thus the smaller the displacement of the rack 6. Conversely, as appreciated from transition from the state shown in FIGS. 7 and 8 to the state shown in FIGS. 5 and 6, as the disc-shaped guide link member 8 rotates in a direction that increase the inclination θ3 of the slotted hole 8a, the ratio (y1/x1 in FIGS. 5 and 6, and y2/x1 in FIGS. 7 and 8) of the lateral displacement to the axial displacement of the protruded portion 7 tends to increase. That is to say, in case of the same steering-shaft rotational movement (θ1), the larger the inclination angle θ3 of the slotted hole 8a, the larger the rotation angle θ2 of the pinion gear block 5, and therefore the larger the displacement of the rack 6. As discussed above, according to the variable-ratio steering system of the embodiment, first of all, the rotary motion of the steering shaft 1 is converted into the linear motion of the nut member 3 in the axial direction of the steering shaft 1 through the ball-bearing-screw mechanism. Such a rotary-to-linear motion converting operation (a first motion conversion feature) of the system of the embodiment is conventional. Note that the variable-ratio steering system of the embodiment includes an additional motion converter having a second motion conversion feature as well as the above-mentioned first motion conversion feature. The second motion conversion feature corresponds to a steering-shaft-rotary-motion-to-nut-member-rotary-motion converting operation. According to the second motion conversion feature, a rotary motion of the steering shaft 1 causes a rotary motion of the nut member 3 about the axis S1 of the steering shaft with a controlled ratio (θ1/θ2) of the rotation angle θ1 of the steering shaft 1 to the rotation angle θ2 of the output pinion gear block 5 (corresponding to the rotation angle of the nut member 3), or with a controlled ratio (θ1/θ3) of the rotation angle θ1 of the steering shaft 1 to the inclination angle θ3 of the slotted hole 8a. Note that the steering-shaft-rotary-motion-to-nut-member-rotary-motion converting operation created by the second motion conversion feature, occurs in synchronization with the rotary-to-linear motion converting operation created by the first motion conversion feature. As a consequence, the nut member 3 (output steering member) spirally moves about the axis S1 of the steering shaft 1 with the controlled ratio (θ1/θ2) of the rotation angle θ1 of the steering shaft 1 to the rotation angle θ2 of the output pinion gear block 5, when the steering wheel and shaft (input steering member) are turned for steering. Therefore, the steering ratio of the steering-wheel rotation angle to the road-wheel steer angle can be varied by varying the controlled ratio as previously discussed. In other words, the change in the controlled ratio results in the change in the steering ratio of the steering-wheel rotation angle to the road-wheel steer angle. The change in the controlled ratio (θ2/θ1 or θ3/θ1) is produced by the variable steering ratio mechanism included in the variable-ratio steering system of the embodiment and shown in FIGS. 1 through 8. As shown in FIGS. 1–8, the variable steering ratio mechanism of the system of the embodiment is comparatively simple in construction. Actually, the variable steering ratio mechanism of the system of the embodiment is operated in response to an engine/vehicle sensor signal, such as a signal from a vehicle speed sensor which is usually incorporated in an automotive vehicle, so as to vary the displacement of rotation of the disc-shaped guide link member 8, that is, the inclination angle θ3 of the slotted hole 8a. For example, a steering ratio used during high-speed driving (during highway driving) is different from a steering ratio used when the vehicle is running at low speeds (during city driving, during cornering or parking), to provide stable vehicle behavior for highway driving and to provide good handling for city driving, cornering or parking. As set forth above, the system of the embodiment can reconcile two requirements, that is, stable vehicle behavior during high-speed driving and good handling during low-speed driving. Also, in the shown embodiment, as clearly seen in FIGS. 1 and 2, the worm gear portion 1a of the ball-screw mechanism is formed as a right-hand thread. The directions L that the slotted hole 8a extends and the direction of inclination of the right-hand thread of the worm gear portion 1a are same. In other words, a direction of a spiral motion of the nut member 3, created by the axial displacement and the rotational displacement of the nut member 3 and a direction of a spiral groove of the worm gear portion 1a of the ball-screw mechanism are same. In this case, the rotational direction of the steering shaft 1 becomes identical to the rotational direction of the nut member 3. The rotary motion of the steering shaft 1 insures a smooth rotary motion of the nut member 3, because of the rotary motion of the nut member (the pinion gear block 5) in the same direction as rotation of the steering shaft 1. Therefore, when the steering wheel and shaft are turned for steering and thus the nut member 3 rotates about the steering shaft 1 in the same direction of rotation of the steering shaft 1, the rotary motion of the nut member 3 can be promoted, thereby resulting in an increment in the axial displacement x1 of the protruded portion 7 of the nut member 3. In other words, the rotary motion of the nut member 3 in the same direction of rotation of the steering shaft 1 assists an increase in the rotational displacement θ2 of the output nut member 3 (or the output-pinion-gear-block 5) with respect to rotation of the steering shaft 1. This contributes to small-sizing of the pinion gear 5. Also, in the system of the embodiment, when the steered wheels are held at their straight-ahead positions, the protruded portion 7 of the nut member 3 is arranged so that the axis of the protruded portion 7 is identical to the rotation axis S2 of the disc-shaped guide link member 8 (see FIG. 2). Thus, a steering ratio obtained during the right-hand steering is identical to that obtained during the left-hand steering. Additionally, when the steering wheel moves towards straight-ahead under a condition where the steering ratio is varied by changing the inclination angle θ3 of the slotted hole 8a by way of rotation of the disc-shaped guide link member 8, the nut member 3 is returned to its initial position along with the protruded portion 7 until the axis of the protruded portion 7 becomes identical to the rotation axis of the disc-shaped guide link member 8. As a consequence, the output steering gear side (that is, the pinion gear block 5 and the rack 6) can be returned to the straight-ahead position. As can be appreciated from the simple construction of the variable-steering system shown in FIGS. 1–8, the number of the coupling portions of mechanical links incorporated in the system of the embodiment are effectively reduced. Thus, the system of the embodiment can reduce undesired rattle or freeplay. This eliminates a poor steering feel which may occur owing to an undesired increase in degree of freedom for the steering-ratio control and a deviation from accurate straight-ahead position arising from a low accuracy of machining.

Figure 6:
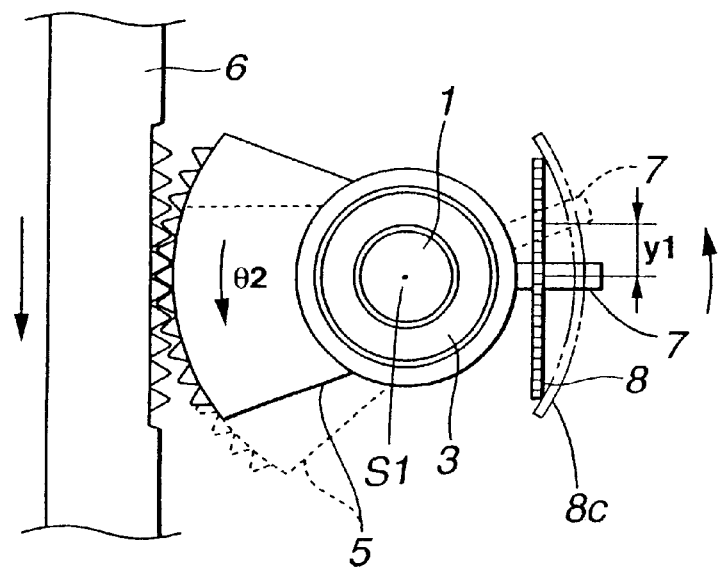
FIG. 6 is a schematic view in the direction of the axis S1 of the steering shaft 1, explaining the relationship between the rotary motion (θ2) of the pinion gear block 5 (the nut member 3) with the lateral displacement y1 of the protruded portion 7.
Figure 7:
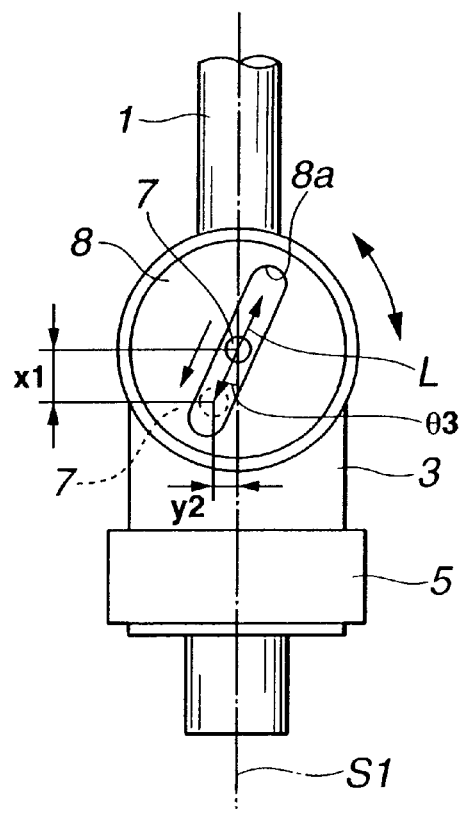
FIG. 7 is a schematic view in the direction of the rotation axis S2 of the disc-shaped guide link member 8, explaining a change (y1→y2) in the lateral displacement of the protruded portion 7 of the nut member 3, with the same axial displacement (x1) of the protruded portion 7, and when the inclination angle (θ3) of the disc-shaped guide link member 8 is slightly reduced from the state shown in FIG. 5.
Figure 8:
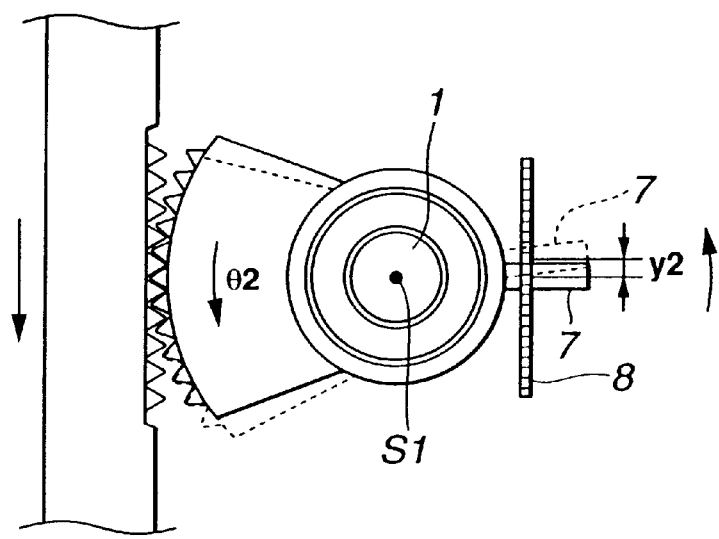
FIG. 8 is a schematic view in the direction of the axis S1 of the steering shaft 1, explaining the decrease in the rotation angle (θ2), occurring due to the decrease (y1→y2) in the lateral displacement of the protruded portion 7.

As previously described, it is preferable that the axis of the protruded portion 7 of the nut member 3 is perpendicular to the rotation axis S1 of the steering shaft 1. However, it does not always follow that the axis of the protruded portion 7 is perpendicular to the rotation axis S1 of the steering shaft 1. for instance, the protruded portion 7 may be formed to extend in a direction somewhat inclined toward the direction of the rotation axis S1 of the steering shaft from the direction perpendicular to the steering shaft 1. In the shown embodiment, although the slotted hole 8a extends in the directions L in a straight line, it does not always follow that the slotted hole 8a is formed in the disc-shaped guide link member 8 in a straight line. In lieu there, as viewed from the rotation axis S2 of the disc-shaped guide link member 8, the slotted hole 8a may be formed in the guide link member 8 as an S-shaped slot with a point, through which the rotation axis S2 passes, as a central figure. In the case that the slotted hole 8a is formed in a straight line, there is a linear relationship between the steering-wheel rotation angle and the road-wheel steer angle. On the other hand, in case of the S-shaped slot, there is a nonlinear relationship between the steering-wheel rotation angle and the road-wheel steer angle. With the nonlinear characteristic of the road-wheel steer angle to the steering-wheel rotation angle, for example, as the steering-wheel rotation angle increases, it is possible to gradually reduce a rate of change in the road-wheel steer angle. In this case, in order for a steering ratio obtained during the right-hand steering to be identical to a steering ratio obtained during the left-hand steering, it is preferable that the S-shaped slotted of the disc-shaped guide link member 8 is point-symmetrical with respect to the enter of the S-shaped slotted hole. In the shown embodiment, the disc-shaped guide link member 8 is arranged parallel to the axis S1 of the steering shaft 1. It will be appreciated that the disc-shaped guide link member 8 may be slightly inclined with respect to the axis S1 of the steering shaft 1 to such an extent that the slotted hole formed in the disc-shaped guide link member 8 allows a smooth sliding motion of the protruded portion 7 of the nut member 3 within the slotted hole. Furthermore, in the system of the embodiment, as a means for guiding a sliding motion of the protruded portion 7 of the nut member 3, a slotted hole 8a is formed in the disc-shaped guide link member 8. That is, the disc-shaped guide link member 8 is formed as a disc-shaped slotted-link member. In place of the disc-shaped slotted-link member, the means for guiding sliding motion of the protruded portion 7 may be formed as a guiding groove cut in the disc-shaped guide link member 8. In the shown embodiment, both side faces of the disc-shaped guide link member 8 are flat. As best seen in FIG. 6, when the protruded portion 7 slides within the slotted hole 8a and is guided by the cam surface of the slotted hole 8a from the position indicated by the solid line to the position indicated by the broken line, there is a slight radial displacement of the protruded portion 7 relative to the slotted hole 8a, because of the flat shape of the slotted-link member 8. To eliminate the slight radial displacement of the protruded portion 7 relative to the slotted hole 8a, the disc-shaped guide link member 8 may be partly formed as a curved surface 8c (see the two-dotted line of FIG. 6), such as part of a curved surface of a right circular cylinder or part of a curved surface of an elliptic cylinder, which is contained in a substantially cylindrical plane coaxial with respect to the axis S1 of the steering shaft 1. Moreover, it is preferable to form the slotted hole 8a in the curved-surface portion of the guide link member 8. More preferably, a bearing may be provided between the slotted hole 8a and the protruded portion 7 for the purpose of less friction and less freeplay.

Referring now to FIGS. 9, 10, 11 and 12, there is shown the variable-ratio steering system of the second embodiment. The system of the second embodiment shown in FIGS. 9–12 is similar to the system of the first embodiment shown in FIGS. 1–8, except that a 21 donut-shaped member or a substantially annular grooved-link member (a ring-shaped member) 20 is used instead of the disc-shaped slotted-link member 8. Thus, the same reference signs used to designate reference signs in the system shown in FIGS. 1–8 will be applied to the corresponding reference signs used in the system of the second embodiment shown in FIGS. 9–12, for the purpose of comparison of the two different embodiments. Component parts 20, 21, 22, 24, 25, and 30 will be hereinafter described in detail with reference to the accompanying drawings, while detailed description of the other component parts denoted by reference signs 1–10 will be omitted because the above description thereon seems to be self-explanatory.

Figure 9:
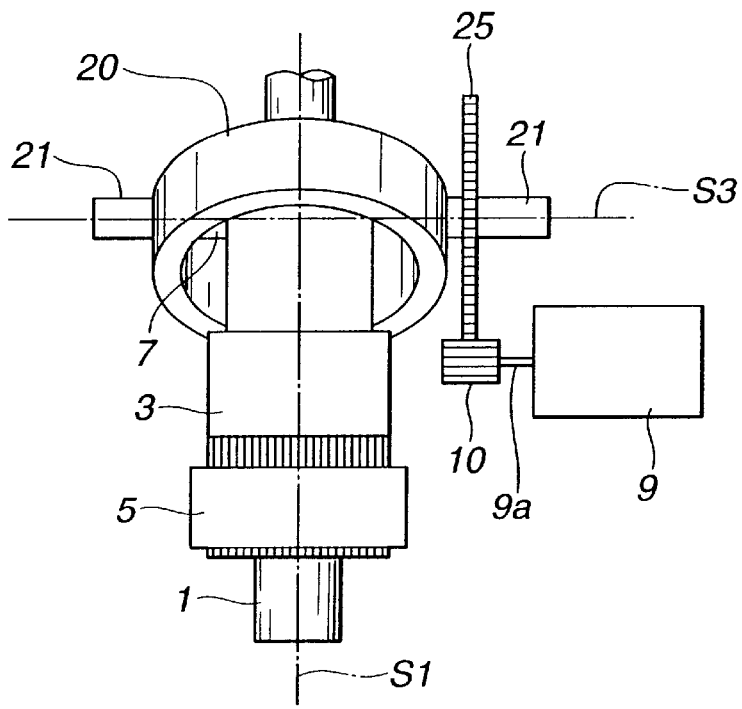
FIG. 9 is a side view of the variable-ratio steering system of a second embodiment.
Figure 10:
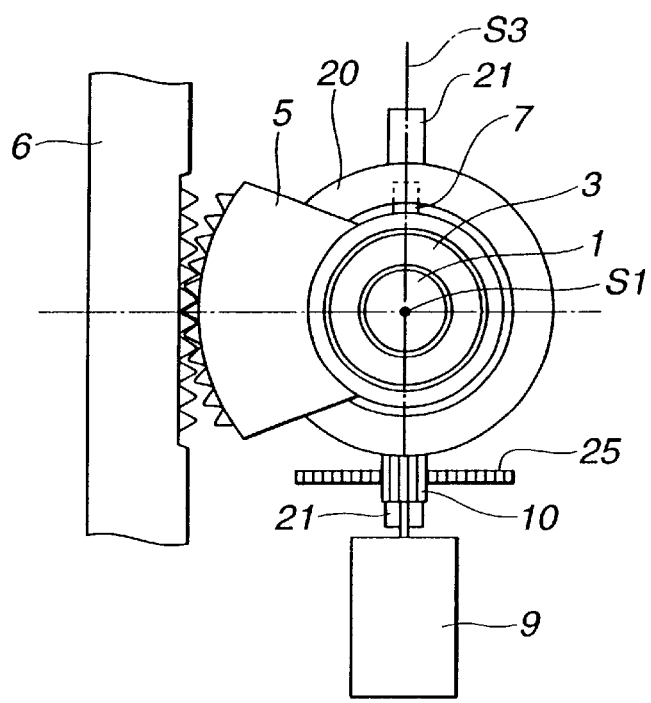
FIG. 10 is a schematic view in the direction of the axis S1 of the steering shaft 1, illustrating a variable steering ratio mechanism incorporated in the variable-ratio steering system of the second embodiment.
Figure 11:
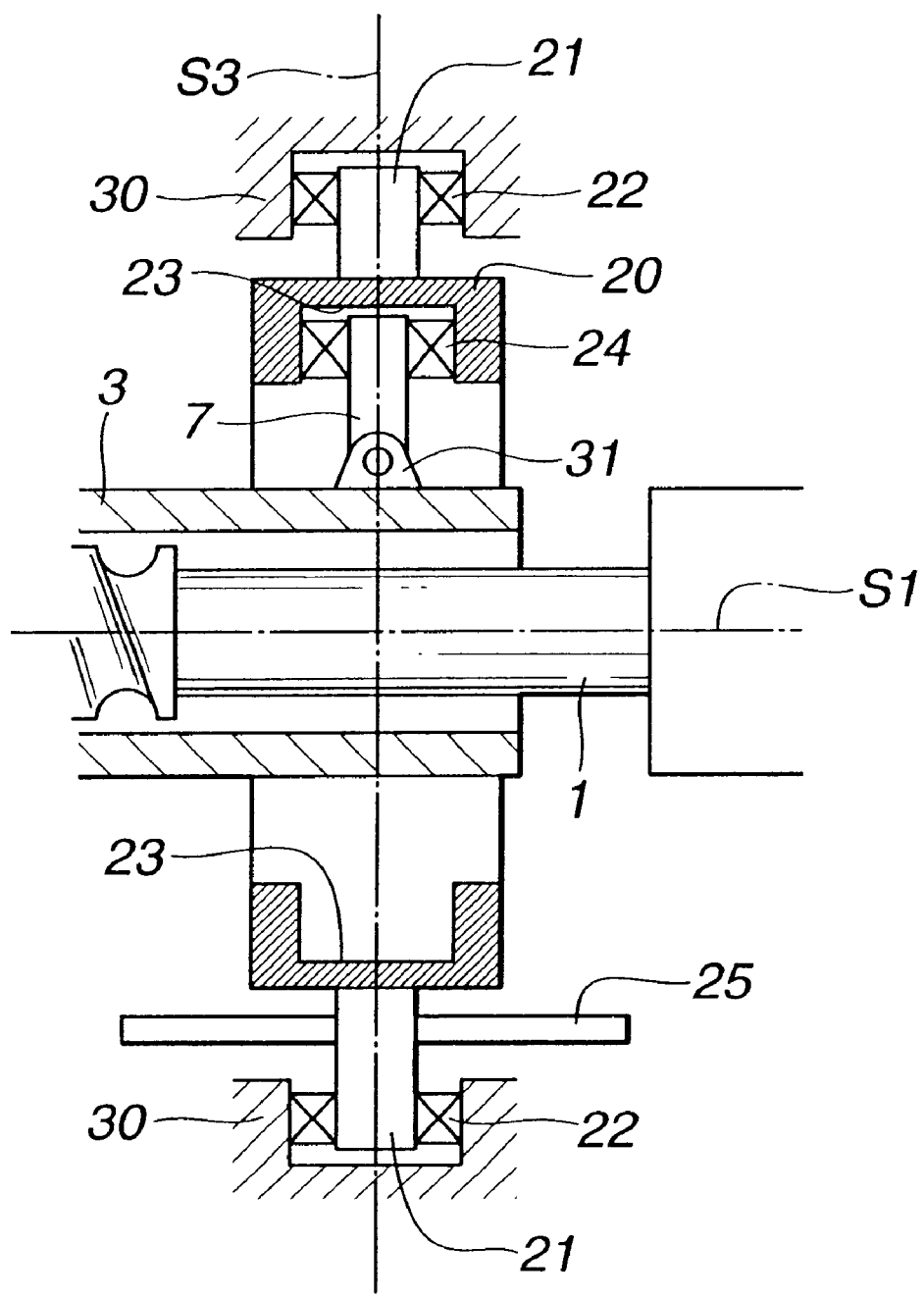
FIG. 11 is a partial cross-sectional view in the direction perpendicular to the axis S1 of the steering shaft, showing the detailed structure at a coupling portion between the donut-shaped member 20 and the protruded portion 7.
Figure 12:
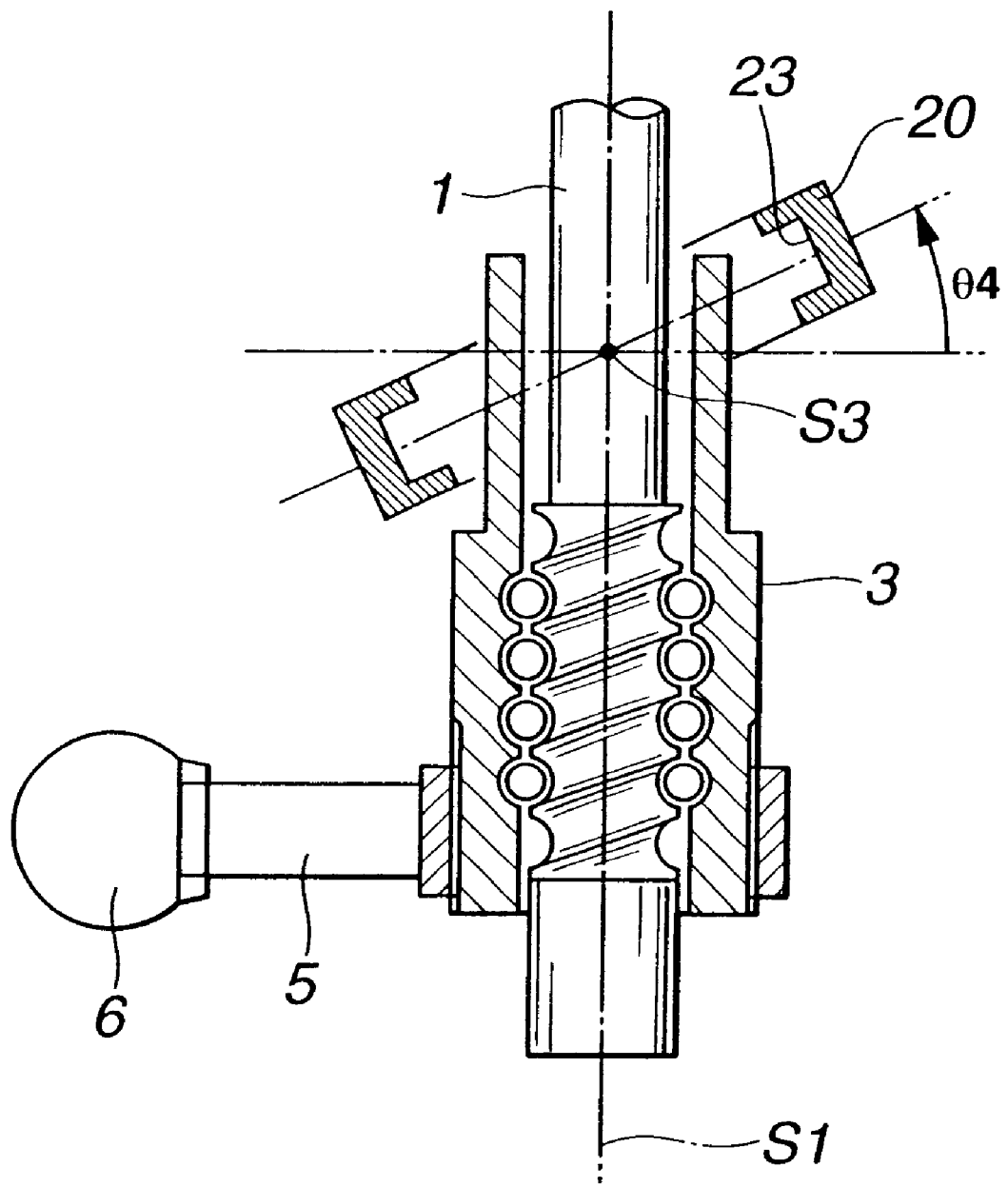
FIG. 12 is a partial cross-sectional view showing an inclined state of the donut-shaped member 20 with respect to the direction perpendicular to the axis S1 of the steering shaft 1.

As seen in FIGS. 9 and 10, the donut-shaped member 20 (the ring-shaped member) is arranged coaxially with respect to the axis S1 of the steering shaft 1, so that the donut-shaped member 20 surrounds the outer periphery of the nut member 3 (and/or the outer periphery of the steering shaft 1). As best seen in FIG. 12, the center of the ring-shaped member (the donut-shaped member) 20 is designed to be located on the axis S1 of the steering shaft 1. The donut-shaped member 20 is supported by means of a pair of support shaft members (21, 21), so that the donut-shaped member 20 is rotatable only about a rotation axis S3 perpendicular to and intersecting the axis S1 of the steering shaft 1. In more detail, as shown in FIG. 11, the donut-shaped member 20 is formed with the two diametrically-opposing support shaft members (21, 21) extending radially outwardly from the outer periphery of the donut-shaped member 20. The support shaft members (21, 21) are rotatably supported by means of a pair of bearings (22, 22) on a vehicle-body side member (a non-rotational member) 30. The donut-shaped member 20 has an annular guide groove 23 (a guide portion) cut in the inner periphery of the donut-shaped member 20 and extending in a circumferential direction of the donut-shaped member 20. The tip of the protruded portion 7 extending from the outer periphery of the nut member 3 is inserted or fitted into the guide groove 23 of the donut-shaped member 20. As clearly seen in FIGS. 10 and 11, when the steering wheel and shaft are positioned at their straight-ahead positions, the protruded portion 7 of the nut member 3 is located on the rotation axis S3 of the donut-shaped member 20. The protruded portion 7 is mechanically linked to or connected onto the outer periphery of the nut member 3, so that the protruded portion 7 is rotatable only about a pivot axis perpendicular to both the axis S1 of the steering shaft 1 and the rotation axis S3 of the donut-shaped member 20, by means of a rotational joint 31 (an oscillating joint mechanism). The pivot axis of the oscillating joint mechanism 31, inhibits the oscillation motion of the protruded portion 7 in a direction that the guide groove 23 extends, that is, in the circumferential direction of the donut-shaped member 20, while permitting the oscillating motion of the protruded portion 7 in a cross direction of the guide groove 23 or in a direction substantially corresponding to the cross direction of the guide groove 23. The variable-ratio steering system of the second embodiment has a simple but effective structure that the guide groove 23 is formed in the inner periphery of the donut-shaped member 20. The guide groove 23 is designed and dimensioned to extend in a direction along a curved surface approximate to a cylindrical surface arranged coaxially to the axis S1 of the steering shaft 1. As a result of this, when the protruded portion 7 moves within the guide groove 23, there is less relative translational displacement of the protruded portion 7 within towards a space defined between the tip of the protruded portion 7 and the inner peripheral wall of the guide groove 23, in a direction that the protruded portion 7 extends, that is, in a direction perpendicular to the axis S1 of the steering shaft 1. In order to absorb or allow the relative translational displacement of the protruded portion 7 within towards the space defined between the inner peripheral wall of the guide groove 23 and the tip of the protruded portion 7, preferably, a cylindrical member may be arranged coaxially with respect to the protruded portion 7 and fitted onto the tip of the protruded portion 7. More preferably, a bearing may be interleaved between the previously-noted cylindrical member and the guide groove 23 to reduce friction loss. In case of the provision of the cylindrical member fitted onto the tip of the protruded portion 7 and the bearing interleaved between the guide groove 23 and the cylindrical member, it is possible to effectively absorb or allow the relative translational displacement of the protruded portion 7 within the guide groove 23 by relative sliding motion of the cylindrical member on the tip end of the protruded portion 7. This eliminates a load which may be applied to the bearing and act in the direction that the protruded portion 7 extends. In the system of the second embodiment, the rotational-displacement regulation means for the nut member 3 is constructed by the protruded portion 7 and the guide groove 23. Furthermore, as shown in FIG. 11, it is preferable that the tip of the protruded portion 7 is in abutted-engagement with the two opposing wall faces of the guide groove 23 through a bearing 24. Due to the abutted-engagement of the tip of the protruded portion 7 with the two opposing wall faces through the bearing 24, the protruded portion 7 is regulated by the guide groove 23, while only the circumferential motion of the protruded portion 7 within the guide groove 23 is permitted regardless of an inclination angle θ4 (see FIG. 12) of the donut-shaped member 20. As shown in FIGS. 9–11, one of the support shaft members (21, 21) is formed integral with a driven gear 25 such as a spur gear. The drive gear 10 of the motor 9 is in meshed-engagement with the gear 25. Therefore, rotating the motor 9 causes a displacement of rotation of the donut-shaped member 20 about the rotation axis S3 passing through the axes of the support shaft member pair (21, 21). Owing to the rotational displacement of the donut-shaped member 20 about the rotation axis S3, the donut-shaped member 20 is slightly inclined in the direction of the axis S1 of the steering shaft 1 (see the inclination angle θ4 shown in FIG. 12). In a straight-ahead state, as best seen in FIG. 10, the protruded portion 7 is designed or arranged so that the axis of the protruded portion 7 is identical to the rotation axis S3 of the donut-shaped member 20. The other structure of the system of the second embodiment is identical to the first embodiment.

Hereunder described is the operation of the variable-ratio steering system of the second embodiment. In the system of the second embodiment shown in FIGS. 9–12, the inclination angle θ4 of the donut-shaped member 20 is defined as an angle between the plane normal to the axis S1 of the steering shaft 1 and the plane normal to the axis of the donut-shaped member 20. According to the system of the second embodiment, in the same manner as the first embodiment, when the steering wheel and shaft are turned for steering, the rotational motion of the steering shaft 1 is converted into a linear motion of the nut member 3 via the ball-bearing-screw mechanism (1a, 2, 3). The linear motion of the nut member 3 causes the protruded portion 7 of the nut member to move along the guide groove 23 of the donut-shaped member 20. The donut-shaped member 20 is actually somewhat inclined with a controlled inclination angle θ4 by means of the drive mechanism (containing the motor 9, the drive shaft 9a, the drive gear 10, the driven gear 25) as shown in FIG. 12. With the linear motion of the nut member 3, the protruded portion 7 moves the same axial displacement as the linear motion of the nut member 3 in the direction of the axis S1 of the steering shaft 1. At the same time, the protruded portion 7 attached onto the nut member moves a rotational displacement based on the inclination angle θ4 of the donut-shaped member 20 in the direction normal to the axis S1 of the steering shaft 1. The rotational displacement of the protruded portion 7 causes the nut member 3 and the pinion gear block 5 in serrated-engagement with the nut member to rotate the rotational displacement based on the inclination angle θ4. In this manner, according to the system of the second embodiment, the rotational motion of the nut member 3 occurs together with the linear motion of the nut member 3 in the direction of the axis S1 of the steering shaft 1, arising from the steering input. The rotational displacement of the nut member 3 can be changed by varying the inclination angle θ4 of the donut-shaped member 20 by way of the rotation of the motor 9. That is to say, the steering ratio of the steering wheel rotation angle to road-wheel steer angle can be varied by changing the inclination angle θ4 of the donut-shaped member 20. As discussed above, during straight-ahead driving, the protruded portion 7 is designed so that the axis of the protruded portion 7 is identical to the rotation axis S3 of the donut-shaped member 20. Thus, in the same manner as the system of the first embodiment, when the steering input side (the steering wheel and shaft) is held at its straight-ahead position, the output side (containing the output nut member 3 plus pinion gear block 5) is also kept at its straight-ahead position, regardless of the steering ratio. Also, with the previously-noted arrangement, a steering ratio obtained during the right-hand steering becomes identical to that obtained during the left-hand steering. The system of the second embodiment is based on the assumption that the rotary motion of the nut member 3 (or the pinion gear block 5) to the left or right is limited to a specified rotation angle such as 90 degrees. Therefore, it is unnecessary to form the guide groove 23 all around the inner periphery of the donut-shaped member 20. For the same reason as set forth above, although the grooved-link member of the motion converter is formed as the donut-shaped member, that is, the circumferentially continuous annular grooved-link member 20, it is unnecessary to continuously form the guide link member. For instance, the grooved-link member 20 may be formed as a substantially C-shaped grooved-link member. Also, in the second embodiment, although the rotation axis S3 of the donut-shaped member 20 is designed to be normal to the axis S1 of the steering shaft 1, the rotation axis S3 of the donut-shaped member 20 may be slightly inclined to the direction of the axis S1 of the steering shaft 1 from the direction normal to the axis S1 of the steering shaft 1, to such an extent that the guide groove 23 of the donut-shaped member 20 allows a smooth sliding motion of the protruded portion 7 within the guide groove 23. In this case, it is preferable that the rotation axis S3 of the donut-shaped member 20 is inclined substantially in the same direction as inclination of the thread of the worm gear portion 1*a* of the ball-screw mechanism with respect to the axis S1 of the steering shaft 1, for the purpose of promotion of the rotational amount of the pinion gear block 5. Also, it is preferable that the plane containing the neutral axis of the donut-shaped member 20 (the central plane parallel to the two opposing parallel planes of the annular guide groove 23, namely the annular base plane and annular top plane of the groove 23) is directed in the rotation axis S3 of the donut-shaped member 20, when the steering wheel and shaft are held at their straight-ahead positions. It is more preferable to design grooved-link member 20 so that the locus of the guide groove 23 is drawn as a complete round as viewed from direction of the axis S1 of the steering shaft 1.

Figure 13:
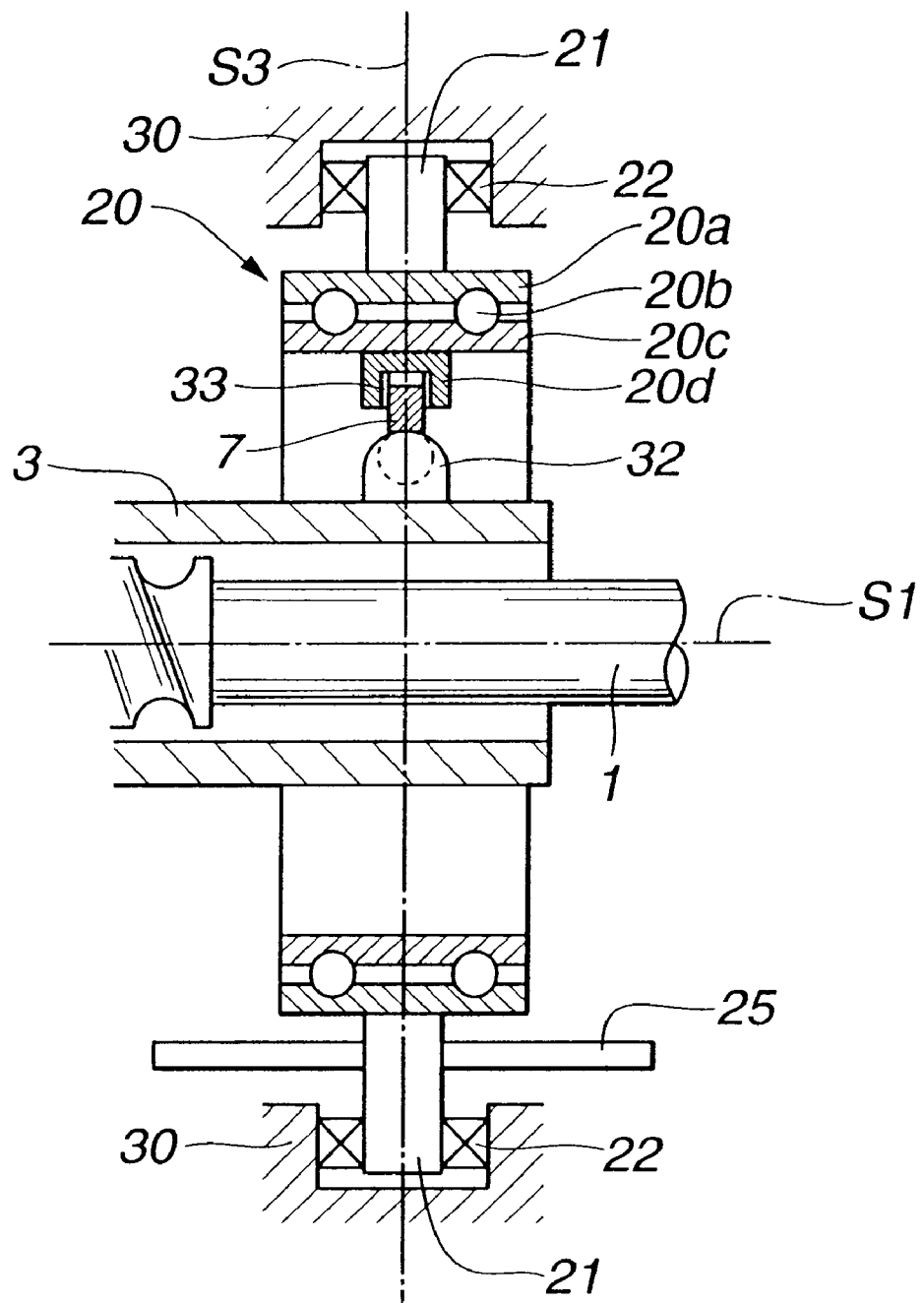
FIG. 13 is a schematic view of a modification of the variable-ratio steering system of the second embodiment shown in FIGS. 9 through 12.

Referring now to FIG. 13, there is shown a modified variable-ratio steering system slightly different from the second embodiment. In the modified system shown in FIG. 13, a double-row ball bearing (20*a*, 20*b*, 20*c*) is used as the donut-shaped member 20. The double-row ball bearing (the donut-shaped member 20) is comprised of an outer ring 20*a*, balls 20*b*, and an inner ring 20*c*. In the system of the modified system, the double-row ball bearing is uses as the guide link member. That is, the inner ring serves as a guide portion, while the outer ring 20*a* serves a substantially ring-shaped member. Another type of rolling bearings may be used as a guide link member for the protruded portion 7. For instance, a single-row roller bearing may be used as a guide link member. A substantially cylindrical cap-like member 20*d* is fixedly connected at its head to the inner peripheral wall surface of the inner ring 20*c*. The cap-like member 20*d* has an inner serrated portion (a serration hole) formed on its cylindrical inner periphery. On the other hand, the protruded portion 7 is oscillatingly connected to the outer periphery of the nut member 3 through a ball joint 32 (an oscillating joint mechanism). The protruded portion 7 is formed at its tip with an external serrated portion (a serration shaft). The internal serrated portion formed on its cylindrical inner periphery of the cup-like member 20*d* and the external serrated portion formed on the protruded portion 7 will be hereinafter referred to as simply "serrations 33". The external serrated portion of the tip of the protruded portion 7 is engaged with the serration hole of the cap-like member 20*d*, in a manner so as to permit a displacement of the protruded portion 7 relative to the cap-like member 20*d* in a substantially radial direction. The external serrated portion formed on the tip of the protruded portion 7 and the serration hole of the cap-like member 20*d* constructs a translational joint mechanism. In the modified system shown in FIG. 13, the protruded portion 7 is mechanically linked to the nut member 3 via the ball joint 32, so that the protruded portion 7 is rotatable in all directions. Additionally, the relative translational displacement of the protruded portion 7 in the substantially radial direction can be effectively absorbed or allowed by way of the serrated-engagement between the tip of the protruded portion 7 and the cap-like member 20*d*. Additionally, by virtue of the serration-connection, the axis of the protruded portion 7 is permanently held in a state perpendicular to the inner peripheral wall of the inner ring 20*c*. This assures a high-precision motion transformation (or a high-precision motion conversion). That is, the motion transformation can be achieved so that the actual rotational displacement of the output nut member 3 (or the output pinion gear block 5), obtained with the input of the steering input side (the input steering wheel and shaft), becomes accurately equal to a desired value. In the modified system shown in FIG. 13, the outer ring 20*a* corresponds to the ring-shaped member (the donut-shaped member 20 in the second embodiment shown in FIGS. 9–12), while the inner ring 20*c* corresponds to the guide portion (the annular guide groove 23 in the second embodiment). As appreciated, the modified system of FIG. 13 operates in the same manner as the system of the second embodiment. The translational-displacement absorbing, internally serrated cap-like member 20*d* is interleaved at the coupling portion between the protruded portion 7 and the inner ring 20*c*, whereas the balls 20*b* are disposed between the outer and inner rings 20*a* and 20*c* so that the balls roll in grooves inside both the inner and outer rings 20*c* and 20*a*. The serrations 33 allowing relative translational displacement cooperates with the balls 20*b* rolling in the grooves inside the inner and outer rings 20*c* and 20*a*, ensures a smooth desired motion with low friction and high efficiency. This ensures the enhanced reliability and good steering feel. Although, in the modified system shown in FIG. 13, the oscillating joint mechanism (the ball joint) 32 is interleaved between the nut member 3 and the protruded portion 7 and the translational joint mechanism (containing the serrations 33) is used at the coupling portion between the protruded portion 7 and the cap-like member 20*d*, in lieu thereof a translational joint mechanism may be provided between the nut member 3 and the protruded portion 7 and an oscillating joint mechanism may be provided between the protruded portion 7 and the cap-like member 20*d*. Instead of providing the oscillating joint mechanism (the ball joint 32) between the nut member 3 and the protruded portion 7, an oscillating joint mechanism may be provided between the cap-like member 20*d* and the inner ring 20*c*.

Figure 14A:
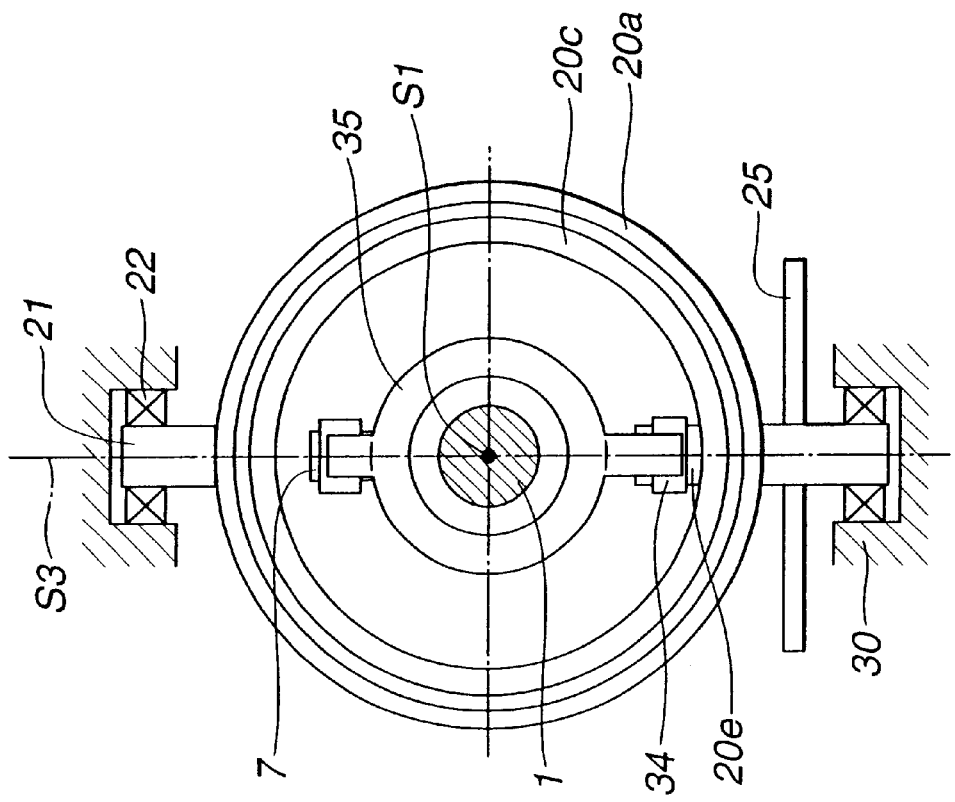
FIGS. 14A and 14B are explanatory views of a variable-ratio steering system of a third embodiment, as viewed respectively in the direction perpendicular to the axis S1 of the steering shaft 1, and in the direction of the axis S1 of the steering shaft.
Figure 14B:
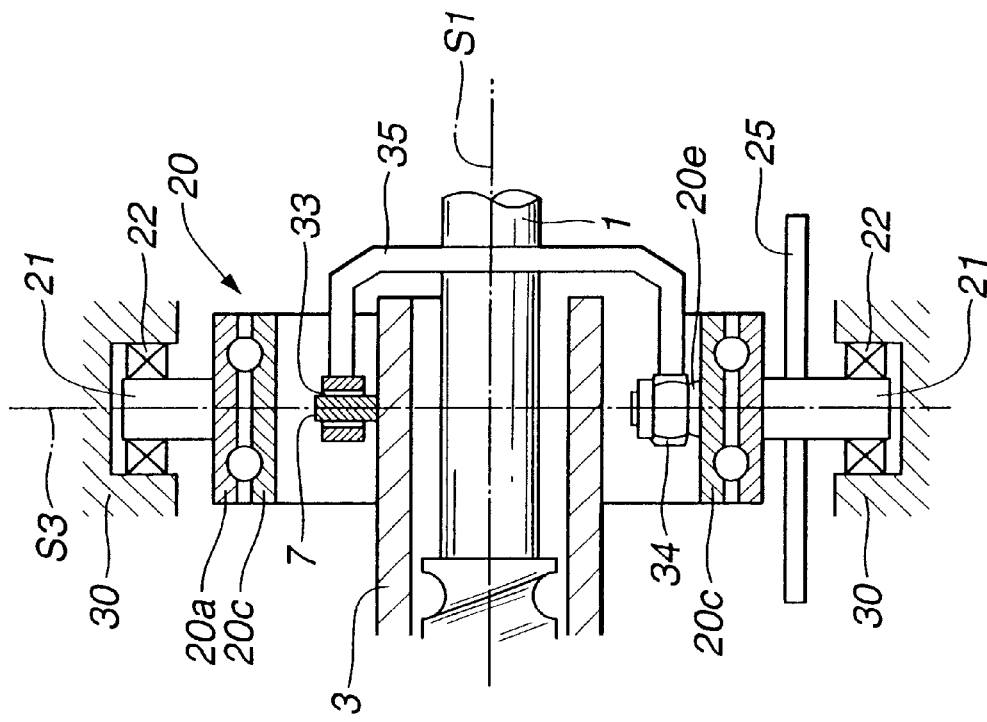

Referring now to FIGS. 14A and 14B, there is shown the variable-ratio steering system of the third embodiment. For the purpose of comparison of the second and third embodiments, the same reference signs used to designate reference signs in the system of the second embodiment shown in FIGS. 9–12 will be applied to the corresponding reference signs used in the system of the third embodiment shown in FIGS. 14A–14B. The system of the third embodiment is superior to the system of the second embodiment and the modified system, from a view point of reduced diametrical dimension. In the system of the second embodiment, the oscillation joint mechanism (the ball joint 32) capable of allowing or absorbing the oscillating displacement and rotational displacement of the protruded portion 7 and the translational displacement joint mechanism (containing the serrations 33) are aligned with each other in the radial direction. The system of the second embodiment (FIGS. 9–12) and the modified system (FIG. 13) requires a comparatively larger space between the nut member 3 and the donut-shaped member 20 or the inner ring 20*c*. There is a problem of a comparatively larger diametrical dimension of the donut-shaped member 20 or the ball bearing (20*a*, 20*b*, 20*c*). To avoid this, in the system of the third embodiment shown in FIGS. 14A and 14B, the protruded portion 7 of the nut member 3 is mechanically linked to the inner ring (the guide portion) 20*c* by means of an arm member 35 (a connecting link). As seen in FIGS. 14A and 14B, the protruded portion 7 is attached onto the outer peripheral wall surface of the nut member 3, such that the axis of the protruded portion 7 is perpendicular to the axis S1 of the steering shaft 1 and the protruded portion 7 extends radially outward. On the other hand, the inner ring 20*c* of the ball bearing has a protruded portion 20*e* extending radially inward from the inner periphery of the inner ring 20*c*, so that the steering shaft 1 is sandwiched between the two different protruded portions 7 and 20*e*, and that the protruded portion 20*e* on the inner periphery of the inner ring 20*c* and the protruded portion 7 on the nut member 3 are offset from each other 180 degrees in a circumferential direction of the steering shaft 1. The two protruded portions 7 and 20e are linked to each other through the arm member 35. The intermediate portion of the arm member 35 is formed as a substantially annular portion having a circular opening through which the steering shaft 1 passes. To permit relative displacement between the protruded portion 7 and one end of the arm member 35 in the substantially radial direction, the one end of the arm member 35 is connected to the protruded portion 7 by way of serrations 33 (corresponding to a translational joint mechanism). On the other hand, the other end of the arm member 35 is connected to the other protruded portion 20e via a pillow block bearing, often called a "pillow ball" 34 (corresponding to an oscillating joint mechanism), in such a manner as to permit relative oscillating motion between the other end of the arm member 35 and the protruded portion 20e. Also, the axial length of the protruded portion 20e is dimensioned to be almost equal to the axial length of the protruded portion 7, and thus the design radial dimension of the space between the inner periphery of the inner ring 20c and the outer periphery of the nut member 3 can be determined depending on only the axial length of the protruded portion 7. With the previously-discussed arrangement of the third embodiment, it is possible to reduce the diametrical dimension of the ring-shaped member (the donut-shaped member 20 or the ball bearing (20a, 20b, 20c)). In the third embodiment, the translational joint mechanism (the serrations 33) is provided at the side of the protruded portion 7 of the nut member 3, while the oscillating joint mechanism (the pillow block bearing 34) is provided at the side of the inner ring 20c of the ball bearing. In contrast to the above, an oscillating joint mechanism may be provided at the side of the protruded portion 7 of the nut member 3, whereas a translational joint mechanism may be provided at the side of the inner ring 20c. In the third embodiment, regarding the layout of the oscillating joint mechanism and the translational joint mechanism, the two joint mechanisms are arranged, so that the protruded portion 20e on the inner periphery of the inner ring 20c and the protruded portion 7 on the nut member 3 are offset from each other 180 degrees in the circumferential direction. In lieu thereof, the two joint mechanisms may be arranged so that the protruded portion 20e on the inner periphery of the inner ring 20c and the protruded portion 7 on the nut member 3 are circumferentially offset from each other a predetermined angle except 180 degrees. From a view point of a greatly balanced motion to input moment, it is more preferable to arrange the two joint mechanisms so that the protruded portion 20e on the inner periphery of the inner ring 20c and the protruded portion 7 on the nut member 3 are circumferentially offset from each other just 180 degrees.

Figure 15:
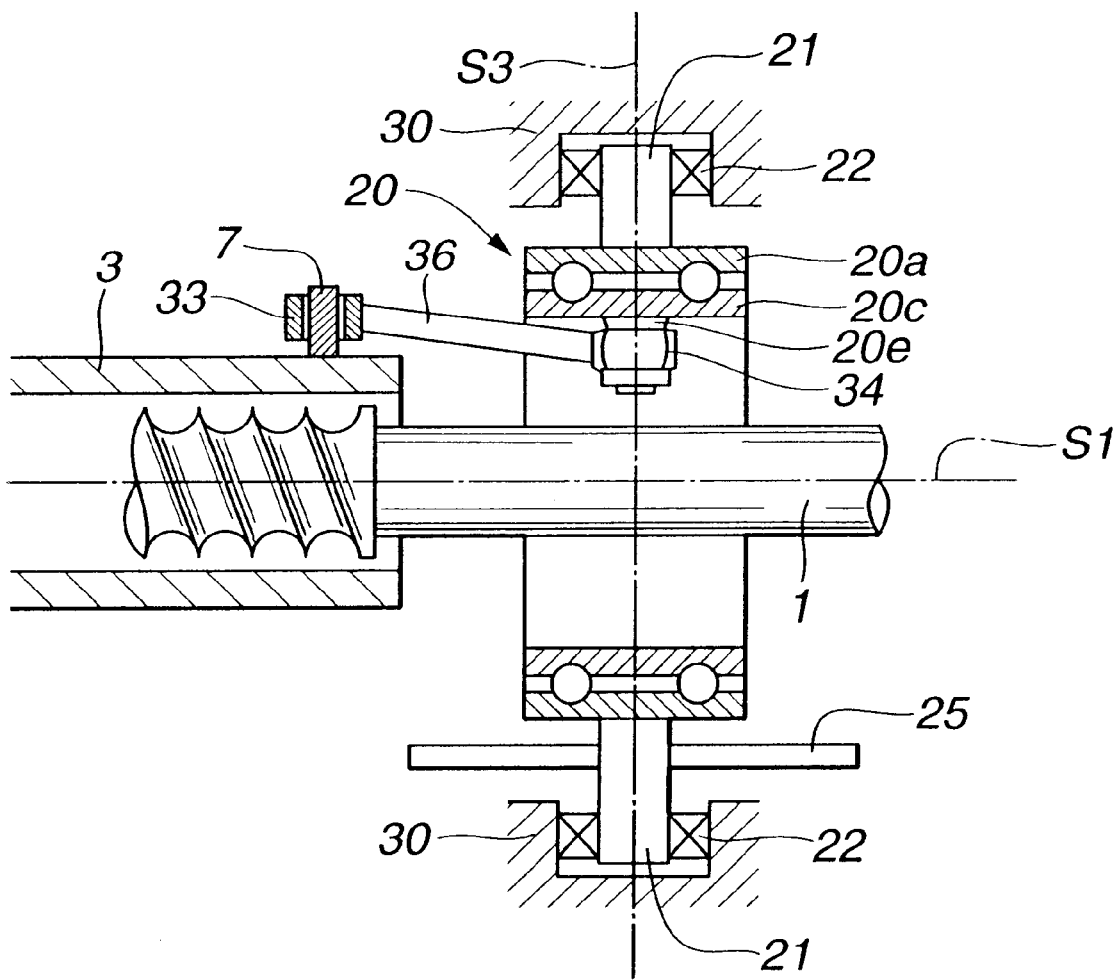
FIG. 15 is an explanatory view of a fourth embodiment, as viewed from the direction normal to the axis S1 of the steering shaft 1.

Referring now to FIG. 15, there is shown the variable-ratio steering system of the fourth embodiment. The basic construction of the system of the fourth embodiment is similar to that of the third embodiment. Thus, the same reference signs used to designate reference signs in the system of the third embodiment shown in FIGS. 14A–14B will be applied to the corresponding reference signs used in the system of the fourth embodiment shown in FIG. 15, for the purpose of comparison of the third and fourth embodiments. The system of the fourth embodiment is different from that of the third embodiment, in that the protruded portion 7 attached onto the nut member 3 is offset from the protruded portion 20e attached onto the inner ring 20c of the ball bearing (the donut-shaped member 20) in the direction of the axis S1 of the steering shaft 1. The two protruded portions 7 and 20e are connected to each other by means of a control arm member 36 (a connecting link). One end of the control arm member 36 is connected to the protruded portion 7 by means of serrations 33 (a translational joint mechanism), in such a manner as to permit relative displacement between the one end of the control arm member 36 and the protruded portion 7 in the substantially radial direction. On the other hand, the other end of the control arm member 36 is connected to the other protruded portion 20e by means of a pillow block bearing, often called a "pillow ball" 34 (corresponding to an oscillating joint mechanism), to permit relative oscillating motion between the other end of the control arm member 36 and the protruded portion 20e. With the two protruded portions 7 and 20e axially offset from each other, it is unnecessary to extend the lower end of the nut member 3 to the rotation axis S3 of the ball bearing (the donut-shaped member 20), that is, within towards the inner ring 20c of the ball bearing 20, for the purpose of guiding the protruded portion 7 of the nut member 3 by the guide portion (the inner ring 20c) of the ball bearing (the donut-shaped member 20). This enhances lay-out flexibility (design flexibility) for the nut member 3 and the donut-shaped member 20. As seen in FIG. 15, in the system of the fourth embodiment, the lower end of the nut member 3 is not located within the inner ring 20c of the ball bearing (the donut-shaped member 20), the diametrical dimension of the donut-shaped member 20 can be further small-sized. The system of the fourth embodiment is superior in reduced system size, lightweight, and reduced total costs, to the system of the second and third embodiments. In the previously-discussed fourth embodiment, the translational joint mechanism (the serrations 33) is provided at the side of the protruded portion 7 of the nut member 3, while the oscillating joint mechanism (the pillow block bearing 34) is provided at the side of the inner ring 20c of the ball bearing. Instead thereof, an oscillating joint mechanism may be provided at the side of the protruded portion 7 of the nut member 3, whereas a translational joint mechanism may be provided at the side of the inner ring 20c.

Figure 16A:
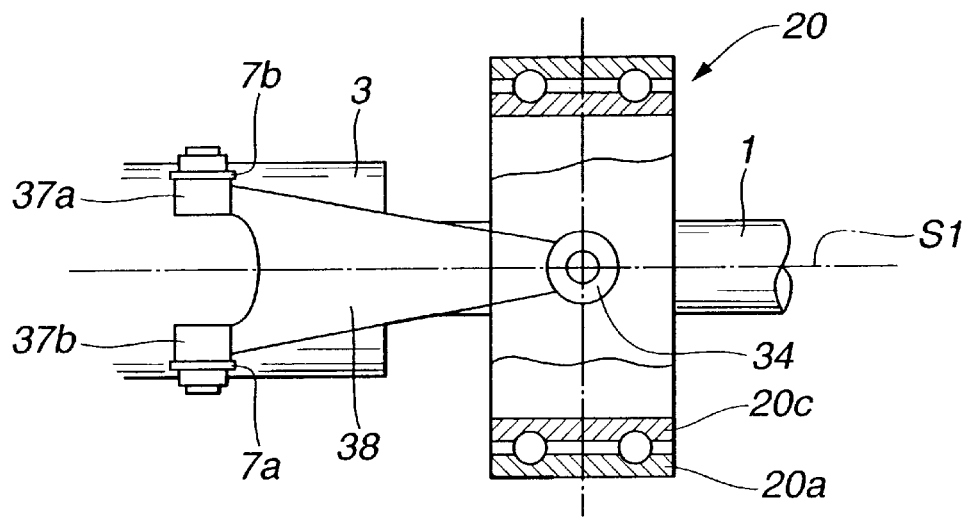
FIGS. 16A and 16B are explanatory views of a variable-ratio steering system of a fifth embodiment, as viewed respectively in the direction perpendicular to the axis S1 of the steering shaft, and in the direction of the rotation axis S3 of the donut-shaped member 20 (the double-row ball bearing).
Figure 16B:
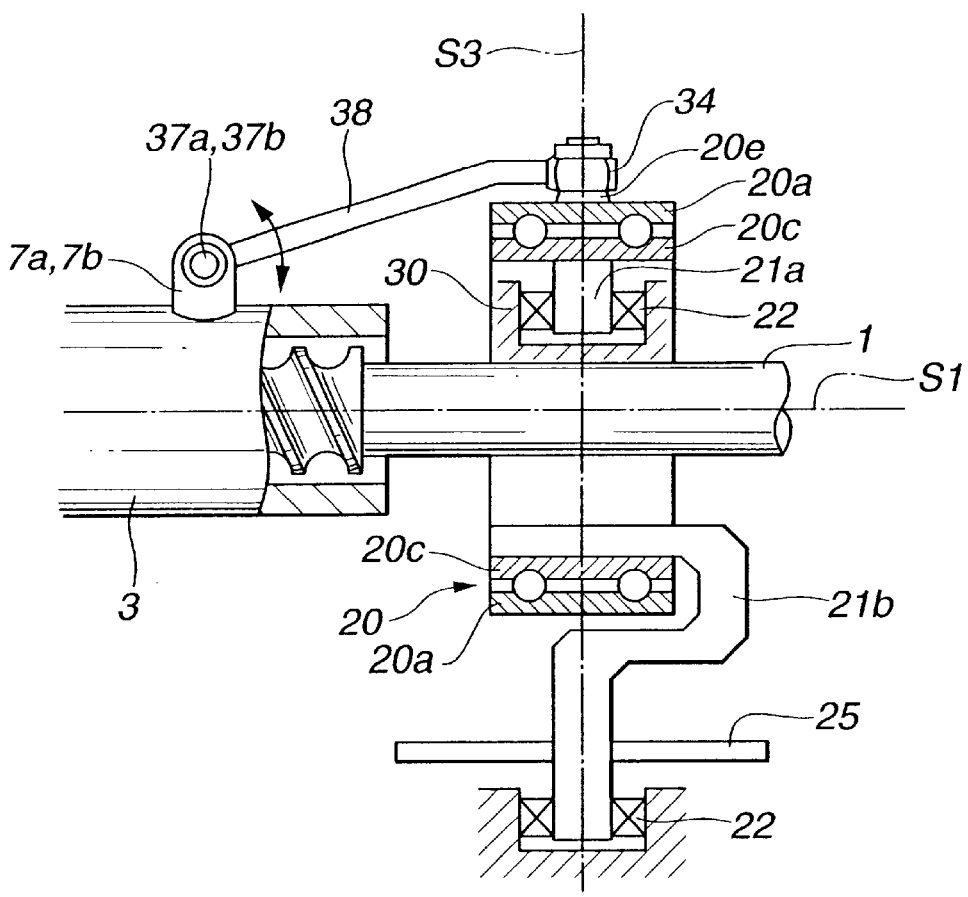

Referring now to FIGS. 16A and 16B, there is shown the variable-ratio steering system of the fifth embodiment. The basic construction of the system of the fifth embodiment is similar to that of the fourth embodiment. Thus, the same reference signs used to designate reference signs in the system of the fourth embodiment shown in FIG. 15 will be applied to the corresponding reference signs used in the system of the fifth embodiment shown in FIGS. 16A and 16B, for the purpose of comparison of the fourth and fifth embodiments. In the systems of the modification (see FIG. 13) of the second embodiment, the third embodiment (see FIGS. 14A and 14B), and the fourth embodiment (see FIG. 15), the diametrically-opposing support shaft members (21, 21) are provided on the outer periphery of the outer ring 20a of the ball bearing (the donut-shaped member 20). On the other hand, in the system of the fifth embodiment, a pair of support shaft members (21a, 21b) are provided on the inner periphery of the inner ring 20c. In more detail, the relatively small, straight support shaft member 21a is fixed to a first inner peripheral wall portion of the inner ring 20c, in such a manner as to extend radially inward from the inner periphery of the inner ring 20c. The relatively long, straight plus curved support shaft member 21b, having two internal bent portions and one external bent portion, and a main straight shaft portion, is fixed to a second inner peripheral wall portion of the inner ring 20c, diametrically opposing the first inner peripheral wall portion, so that the two internal bent portions and one external bent portion are formed to avoid the interference between the outer ring 20a of the ball bearing 20 and the support shaft member 21b, and that the main straight shaft portion of the curved support shaft member 21b extends radially outward. The driven gear 25 is coaxially fixedly connected to the main straight shaft portion of the support shaft member 21b, to transmit rotation of the motor 9 to the ball bearing (the donut-shaped member 20). To permit only a rotary motion of the ball bearing 20 about the axis S3, the inner end of the relatively short support shaft member 21a and the outer end of the main straight shaft portion of the curved support shaft member 21b are rotatably supported via a pair of bearings (22, 22) on the vehicle-body side member 30 (a non-rotational member). The supporting structure permits only a circumferential displacement of the outer ring 20a relative to the inner ring 20c. That is, in the system of the fifth embodiment, the outer ring 20a serves as the guide portion, whereas the inner ring 20c serves as the ring-shaped member. Additionally, in the system of the fifth embodiment, one protruded portion 7 is replaced with a pair of protruded portions 7a and 7b. As clearly seen in FIG. 16A, the two protruded portions 7a and 7b are fixedly connected onto the outer periphery of the nut member 3 and juxtaposed to each other, so that these protruded portions are symmetrical with respect to the axis S1 of the steering shaft 1. The other protruded portion 20e is fixedly connected to the outer periphery of the outer ring 20a of the ball bearing (the donut-shaped member 20), so that the protruded portion 20e extends radially outward from the outer periphery of the outer ring 20a and the axis of the protruded portion 20e is identical to the rotation axis S3 of the donut-shaped member 20. Two-split ends of an inverted A-shaped control arm 38 (a connecting link) are rotatably connected to the respective protruded portions 7a and 7b of the nut member 3 by means of a pair of ball joints 37a and 37b (corresponding to a rotational joint mechanism). To insure a smooth rotary motion, the two ball joints (37a, 37b) and the two protruded portions (7a, 7b) are arranged, so that the two pivots of the two-split ends of the inverted A-shaped control arm 38 the pivot of the ball joint are coaxial. On the other hand, the vertex portion of the inverted A-shaped control arm 38 is oscillatingly connected to the protruded portion 20e of the outer ring 20a by means of a pillow block bearing, often called a "pillow ball" 34 (corresponding to an oscillating joint mechanism). In the same manner as the system of the fourth embodiment, the protruded portion pair (7a, 7b) and the other protruded portion 20e included in the system of the fifth embodiment are offset from each other in the direction of the axis S1 of the steering shaft 1. With the protruded portions (7a, 7b) and 20e axially offset from each other, it is unnecessary to extend the lower end of the nut member 3 to the rotation axis S3 of the ball bearing (the donut-shaped member 20). The lay-out flexibility (design flexibility) for the nut member 3 and the donut-shaped member 20 can be enhanced. As seen in FIGS. 16A and 16B, in the system of the fifth embodiment, the lower end of the nut member 3 is not located within the inner ring 20c, the diametrical dimension of the donut-shaped member 20 can be further small-sized, in comparison with the second and third embodiments. As appreciated, the system of the fifth embodiment is superior in reduced system size, lightweight, and reduced total costs, to the system of the second and third embodiments. Moreover, the system of the fifth embodiment does not use a sliding-contact coupling portion such as serrations (a translational displacement joint mechanism). The system of the fifth embodiment can achieve the desired motions with less friction and high efficiency, thus ensuring the enhanced reliability and good steering feel. In the fifth embodiment, although the two ball joints (37a, 37b) are uses a rotational joint mechanism, another type of joint mechanism may be used to satisfy a necessary condition where the inverted A-shaped control arm 38 is rotatable about the pivot passing through the two protruded portions (7a, 7b), and unrotatable in the direction perpendicular to the previously-noted pivot.

In the shown embodiments, the variable steering ratio mechanism of the variable-ratio steering system is provided in close vicinity to the pinion gear block 5 (the nut member 3), but the construction of the system of the invention is not limited to the particular embodiments shown. For instance, the variable steering ratio mechanism may be mounted on a portion of the steering column near the steering wheel. In this case, the nut member 3 must be mechanically linked to the variable steering ratio mechanism by virtue of an additional linkage.

Also, in the shown embodiments, the variable-ratio steering system is exemplified in an automobile with a steering wheel. As can be appreciated from the above, the system of the invention can be widely used in all kinds of automotive vehicles containing an aircraft shipping. For instance, the variable-ratio steering system may be associated with a control column of an aircraft.

The entire contents of Japanese Patent Application Nos. P11-117867 (filed Apr. 26, 1999) and P11-256036 (filed Sep. 9, 1999) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A variable-ratio steering system comprising:
   a steering shaft adapted to be connected to a manually-operated handle;
   an intermediate member engaging with said steering shaft, and capable of moving in a direction of an axis of said steering shaft by a rotary motion of said steering shaft;
   a first converter converting the rotary motion of said steering shaft into an axial displacement of said intermediate member in the direction of an axis of said steering shaft;
   a second converter generating a rotational displacement of said intermediate member about the axis of said steering shaft with the axial displacement of said intermediate member;
   a pinion gear connected to said intermediate member and capable of rotating together with said intermediate member;
   a rack engaged with said pinion gear, and adapted to be connected at both ends of said rack via knuckle mechanisms to steered wheels, for varying a steer angle at the steered wheels depending on a displacement of said rack; and
   said second converter having a variable steering ratio mechanism which varies a ratio of a rotational displacement of said intermediate member about the axis of said steering shaft to the axial displacement of said intermediate member.

2. The variable-ratio steering system as claimed in claim 1, wherein said first converter comprises a ball-bearing-screw mechanism including an external screw-threaded portion formed on an outer periphery of said steering shaft, an internal screw-threaded portion formed on an inner periphery of said intermediate member, and balls disposed between the external screw-threaded portion and the internal screw-threaded portion so that the balls roll in the internal and external screw-threaded portions.

3. The variable-ratio steering system as claimed in claim 2, wherein (i) a direction of a spiral motion of said intermediate member, created by the axial displacement plus the rotational displacement of said intermediate member, and (ii) a direction of the external screw-threaded portion of the ball-bearing-screw mechanism are the same.

4. The variable-ratio steering system as claimed in claim 1, wherein said intermediate member is coaxial with the axis of said steering shaft, and said pinion gear is mechanically linked to said intermediate member to permit a relative motion of said pinion gear to said intermediate member in only the direction of the axis of said steering shaft.

5. The variable-ratio steering system as claimed in claim 4, wherein said pinion gear is mechanically linked to said intermediate member by serration-connection allowing a relative translational displacement of said intermediate member to said pinion gear in the direction of the axis of said steering shaft.

6. The variable-ratio steering system as claimed in claim 4, wherein said second converter comprises:
(a) a rotational-displacement regulation section which regulates the rotational displacement of said intermediate member about the axis of said steering shaft, said rotational-displacement regulation section including:
(i) a protruded portion attached to an outer periphery of said intermediate member and extending radially away from the axis of said steering shaft,
(ii) a guide link member having a guide portion extending in a direction inclined a predetermined inclination angle with respect to the axis of said steering shaft as viewed from a direction perpendicular to the axis of said steering shaft for guiding a motion of the protruded portion by the guide portion; and
(b) an inclination-angle alteration section which alters the predetermined inclination angle of the guide portion.

7. The variable-ratio steering system as claimed in claim 6, wherein the guide link member has a curved surface contained in a substantially cylindrical plane coaxial with respect to the axis of said steering shaft, and the guide portion is formed in the guide link member so that the guide portion extends along the curved surface.

8. The variable-ratio steering system as claimed in claim 7, wherein the curved surface of the guide link member is a curved surface of a right circular cylinder coaxial with respect to the axis of said steering shaft.

9. The variable-ratio steering system as claimed in claim 7, wherein the curved surface of the guide link member is a curved surface of an elliptic cylinder coaxial with respect to the axis of said steering shaft.

10. The variable-ratio steering system as claimed in claim 6, wherein the guide portion comprises a slotted hole formed in the guide link member and extending in the direction inclined the predetermined inclination angle with respect to the axis of said steering shaft as viewed from the direction perpendicular to the axis of said steering shaft, and the protruded portion is slidably inserted into the slotted hole, and wherein said inclination-angle alteration section has a rotating mechanism which rotatably supports the guide link member to permit rotation of the guide link member about only a predetermined rotation axis and alters the predetermined inclination angle of the guide portion with respect to the axis of the steering shaft by the rotation of the guide link member about the predetermined rotation axis.

11. The variable-ratio steering system as claimed in claim 6, wherein the guide portion comprises a guiding groove formed in the guide link member and extending in the direction inclined the predetermined inclination angle with respect to the axis of said steering shaft as viewed from the direction perpendicular to the axis of said steering shaft, and the protruded portion is slidably inserted into the guiding groove, and wherein said inclination-angle alteration section has a rotating mechanism which rotatably supports the guide link member to permit rotation of the guide link member about only a predetermined rotation axis, and alters the predetermined inclination angle of the guide portion with respect to the axis of the steering shaft by the rotation of the guide link member about the predetermined rotation axis.

12. The variable-ratio steering system as claimed in claim 4, wherein said second converter comprises:
(a) a rotational-displacement regulation section which regulates the rotational displacement of said intermediate member about the axis of said steering shaft, said rotational-displacement regulation section including:
(i) a protruded portion attached to an outer periphery of said intermediate member and extending radially away from the axis of said steering shaft,
(ii) a guide link member comprising a substantially annular ring-shaped member arranged coaxially with respect to the axis of said steering shaft so that the substantially annular ring-shaped member surrounds an outer periphery of at least one of said intermediate member and said steering shaft and a center of the substantially annular ring-shaped member is located on the axis of said steering shaft, and having a guide portion provided in one of inner and outer peripheries of the substantially annular ring-shaped member and extending in a circumferential direction of the substantially annular ring-shaped member for guiding a motion of the protruded portion by the guide portion; and
(b) an inclination-angle alteration section which alters the predetermined inclination angle of the guide portion.

13. The variable-ratio steering system as claimed in claim 12, wherein the guide portion comprises a guide groove formed in the inner periphery of the substantially annular ring shaped member and extending in the circumferential direction, and the protruded portion is slidably inserted into the guide groove, and wherein said inclination-angle alteration section has a rotating mechanism which rotatably supports the substantially annular ring-shaped member to permit rotation of the substantially annular ring-shaped member about only a predetermined rotation axis passing through the axis of said steering shaft and alters a predetermined inclination angle of the substantially annular ring-shaped member by the rotation of the substantially annular ring-shaped member about the predetermined rotation axis, the predetermined inclination angle of the substantially annular ring-shaped member being defined as an angle between a plane normal to the axis of said steering shaft and a plane normal to an axis of the substantially annular ring-shaped member.

14. The variable-ratio steering system as claimed in claim 12, wherein the guide link member comprises a rolling bearing having inner and outer rings and balls interleaved therebetween, and the substantially annular ring-shaped member includes the outer ring and the guide portion includes the inner ring, and the protruded portion is engaged with the inner ring for rotation of the protruded portion in the circumferential direction together with the inner ring, and wherein said inclination-angle alteration section has a rotating mechanism which rotatably supports the rolling bearing to permit rotation of the rolling bearing about only a predetermined rotation axis passing through the axis of said steering shaft and alters a predetermined inclination angle of the rolling bearing by the rotation of the rolling bearing about the predetermined rotation axis, the predetermined inclination angle of the rolling bearing being defined as an angle between a plane normal to the axis of said steering shaft and a plane normal to an axis of the rolling bearing.

15. The variable-ratio steering system as claimed in claim 12, wherein the guide link member comprises a rolling bearing having inner and outer rings and balls interleaved therebetween, and the substantially annular ring-shaped member includes the inner ring and the guide portion includes the outer ring, and the protruded portion is engaged with the outer ring for rotation of the protruded portion in the circumferential direction together with the outer ring, and wherein said inclination-angle alteration section has a rotating mechanism which rotatably supports the rolling bearing to permit rotation of the rolling bearing about only a predetermined rotation axis passing through the axis of said steering shaft and alters a predetermined inclination angle of the rolling bearing by the rotation of the rolling bearing about the predetermined rotation axis, the predetermined inclination angle of the rolling bearing being defined as an angle between a plane normal to the axis of said steering shaft and a plane normal to an axis of the rolling bearing.

16. The variable-ratio steering system as claimed in claim 10, wherein the predetermined rotation axis of the guide link member extends in a direction perpendicular to the axis of said steering shaft and intersects the guide portion, and the protruded portion is in engagement with the guide portion at a position of the guide portion where the predetermined rotation axis of the guide link member intersects the guide portion when said steering shaft is held in a straight-ahead position.

17. The variable-ratio steering system as claimed in claim 14, wherein the predetermined rotation axis of the rolling bearing extends in a direction perpendicular to the axis of said steering shaft and intersects the guide portion, and the protruded portion is in engagement with the guide portion at a position of the guide portion where the predetermined rotation axis of the rolling bearing intersects the guide portion when said steering shaft is held in a straight-ahead position.

18. The variable-ratio steering system as claimed in claim 12, which further comprises an oscillating joint mechanism provided at a first coupling portion of a coupling portion between the intermediate member and the protruded portion and a coupling portion between the protruded portion and the guide portion of the substantially annular ring-shaped member, and a translational joint mechanism provided at the second coupling portion.

19. The variable-ratio steering system as claimed in claim 18, which further comprises a connecting link mechanically linking the protruded portion to the guide portion of the substantially annular ring-shaped member, and wherein a coupling portion between the connecting link and the protruded portion and a coupling portion between the connecting link and the guide portion are arranged to be offset from each other in a circumferential direction of said steering shaft, and the oscillating joint mechanism is provided at a first coupling portion of the two coupling portions and the translational joint mechanism is provided at the second coupling portion.

20. The variable-ratio steering system as claimed in claim 18, which further comprises a connecting link mechanically linking the protruded portion to the guide portion of the substantially annular ring-shaped member, and wherein a coupling portion between the connecting link and the protruded portion and a coupling portion between the connecting link and the guide portion are arranged to be offset from each other in the direction of the axis of said steering shaft, and the oscillating joint mechanism is provided at a first coupling portion of the two coupling portions and the translational joint mechanism is provided at the second coupling portion.

21. The variable-ratio steering system as claimed in claim 15, wherein the protruded portion comprises a pair of protruded portions attached onto the outer periphery of said intermediate member and juxtaposed to each other, so that the protruded portions are symmetrical with respect to the axis of said steering shaft, and which further comprises a connecting link mechanically linking the protruded portions to the guide portion of the substantially annular ring-shaped member, and wherein a coupling portion between the connecting link and the protruded portions and a coupling portion between the connecting link and the guide portion are arranged to be offset from each other in the direction of the axis of said steering shaft, and a rotational joint mechanism is provided at the coupling portion between the connecting link and the protruded portions and an oscillating joint mechanism is provided at the coupling portion between the connecting link and the guide portion.

22. A variable-ratio steering system comprising:

a steering shaft adapted to be connected to a manually-operated handle and having a worm gear portion;

a ball nut engaging with the worm gear portion of said steering shaft via recirculating balls, and capable of moving in a direction of an axis of said steering shaft by a rotary motion of said steering shaft;

a first converting means for converting the rotary motion of said steering shaft into an axial displacement of said ball nut in the direction of an axis of said steering shaft;

a second converting means for generating a rotational displacement of said ball nut about the axis of said steering shaft with the axial displacement of said ball nut;

a pinion gear block connected to said ball nut for rotating together with said ball nut;

a rack engaged with said pinion gear block, and adapted to be connected at both ends of said rack via knuckle mechanisms to steered wheels, for varying a steer angle at the steered wheels depending on a displacement of said rack; and said second converting means having a variable steering ratio mechanism which varies a ratio of a rotational displacement of said ball nut about the axis of said steering shaft to the axial displacement of said ball nut to vary a steering ratio of steering wheel rotation angle to steer angle at the steered wheels.

* * * * *